United States Patent
Okcuoglu

[11] Patent Number: 5,827,145
[45] Date of Patent: Oct. 27, 1998

[54] HYDRAULIC COUPLING HAVING SUPPLEMENTAL ACTUATION

[75] Inventor: Murat N. Okcuoglu, Santa Barbara, Calif.

[73] Assignee: ASHA Corporation, Santa Barbara, Calif.

[21] Appl. No.: 819,848

[22] Filed: Mar. 17, 1997

[51] Int. Cl.$^6$ .................................................. F16H 48/26
[52] U.S. Cl. .......................................... 475/88; 192/103 F
[58] Field of Search .................................... 192/57, 87.11, 192/70.2, 103 F; 74/650; 60/428; 475/88, 89, 234

[56] References Cited

U.S. PATENT DOCUMENTS

| | | |
|---|---|---|
| 1,660,588 | 2/1928 | Wishart et al. |
| 3,748,928 | 7/1973 | Shiber. |
| 4,727,966 | 3/1988 | Hiramatsu et al. |
| 4,821,604 | 4/1989 | Asano ............................. 192/103 F X |
| 5,189,930 | 3/1993 | Kameda ............................ 192/87.11 X |
| 5,310,388 | 5/1994 | Okcuoglu et al. |
| 5,536,215 | 7/1996 | Shaffer et al. |
| 5,595,214 | 1/1997 | Shaffer et al. |
| 5,611,746 | 3/1997 | Shaffer ...................................... 475/89 |
| 5,709,627 | 1/1998 | Teraoka ................................. 475/88 X |
| 5,735,764 | 4/1998 | Shaffer et al. ........................... 475/88 |

*Primary Examiner*—Charles A. Marmor
*Assistant Examiner*—Saúl J. Rodríguez
*Attorney, Agent, or Firm*—Brooks & Kushman P.C.

[57] ABSTRACT

A supplemental pressurized hydraulic supply (103) provides control of a hydraulic coupling (32a,32b,32c) that normally operates in response to differential rotation between a pair of rotary members (26,28) to provide actuation of a clutch (68) that couples the pair of rotary members. A rotary seal assembly (104) of the supply (103) feeds pressurized hydraulic fluid to the coupling to provide supplemental actuation of the clutch (68) that is normally actuated by hydraulic fluid from a hydraulic pump (48) that operates in response to the differential rotation between the pair of rotary members. In one embodiment, the hydraulic coupling (32a) also includes a differential gear set (36). A further embodiment of the hydraulic coupling (32b) includes a clutch (68) having a pair of clutch packs (69) that can be individually actuated by the supplement pressurized hydraulic fluid supply (103). A further embodiment of the hydraulic coupling (32c) has a pair of rotary members embodied by an annular gear (26) and a rotary member (28) extending completely through the coupling.

12 Claims, 12 Drawing Sheets

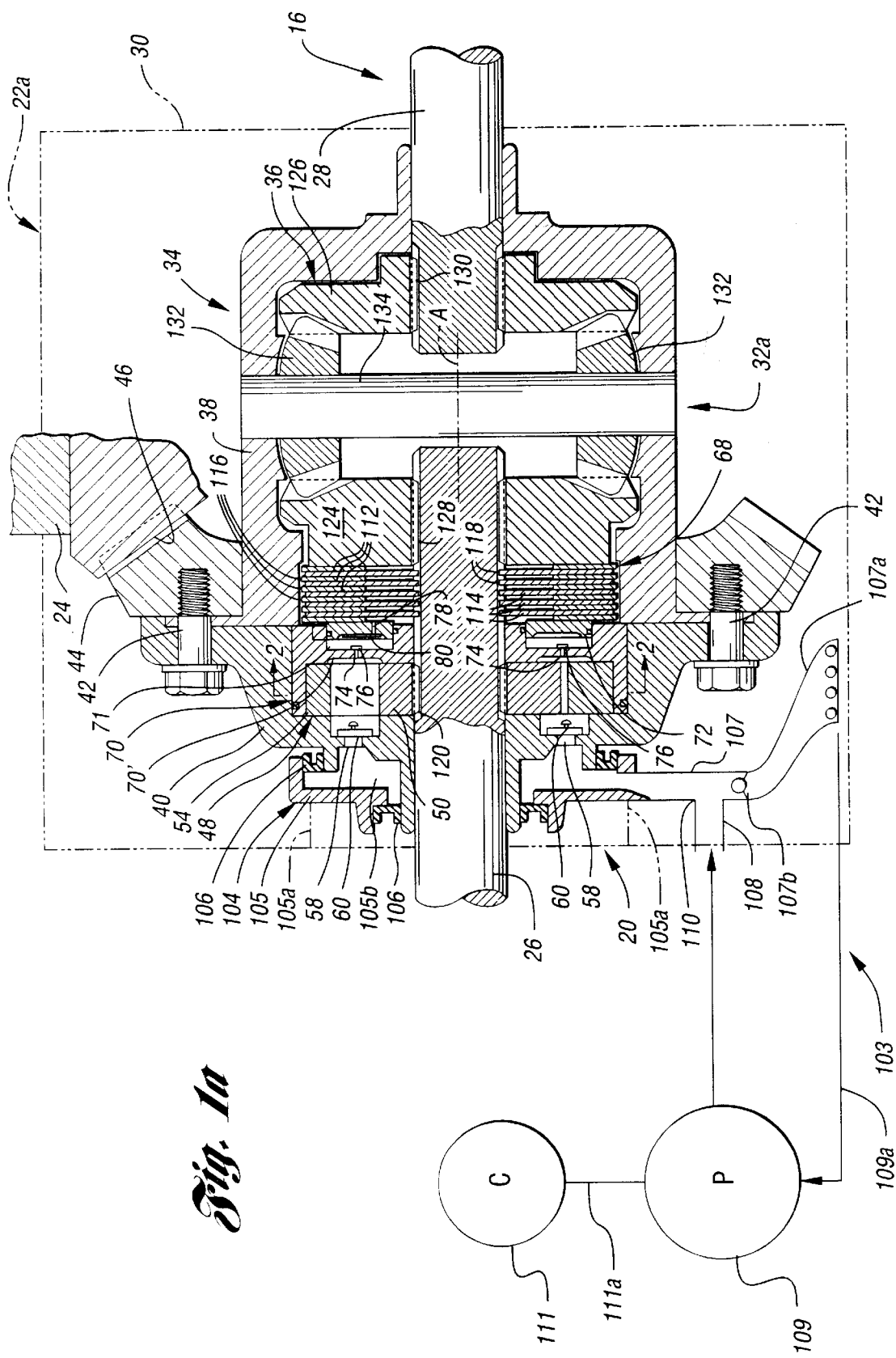

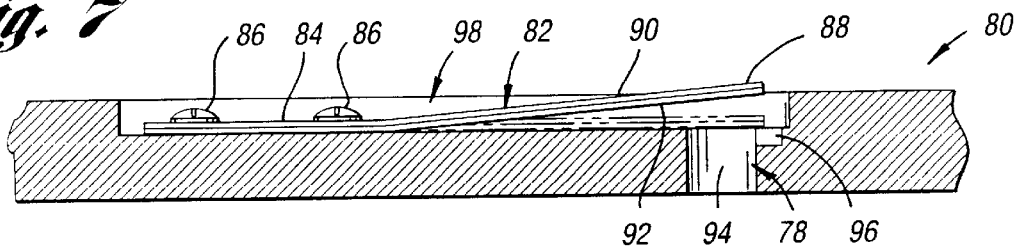
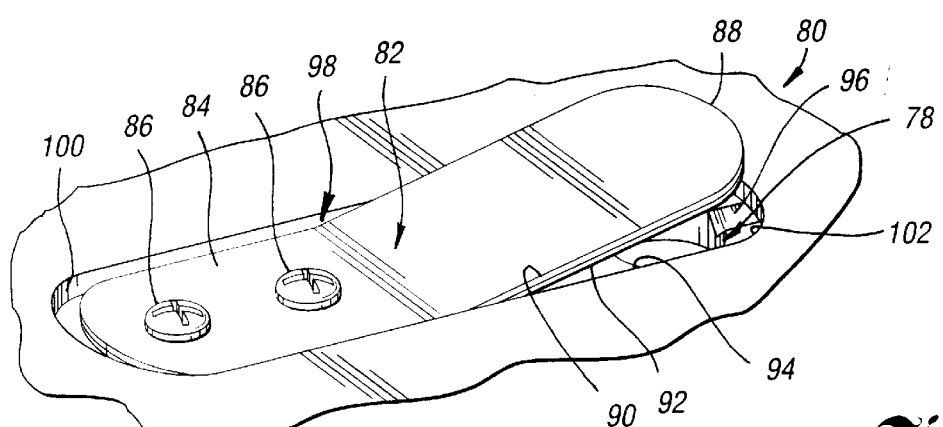
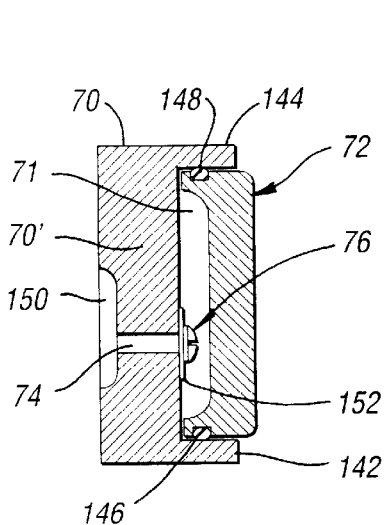
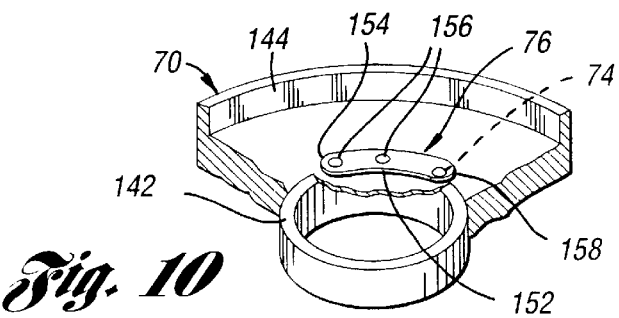
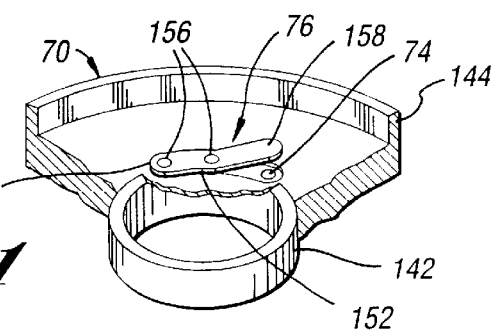

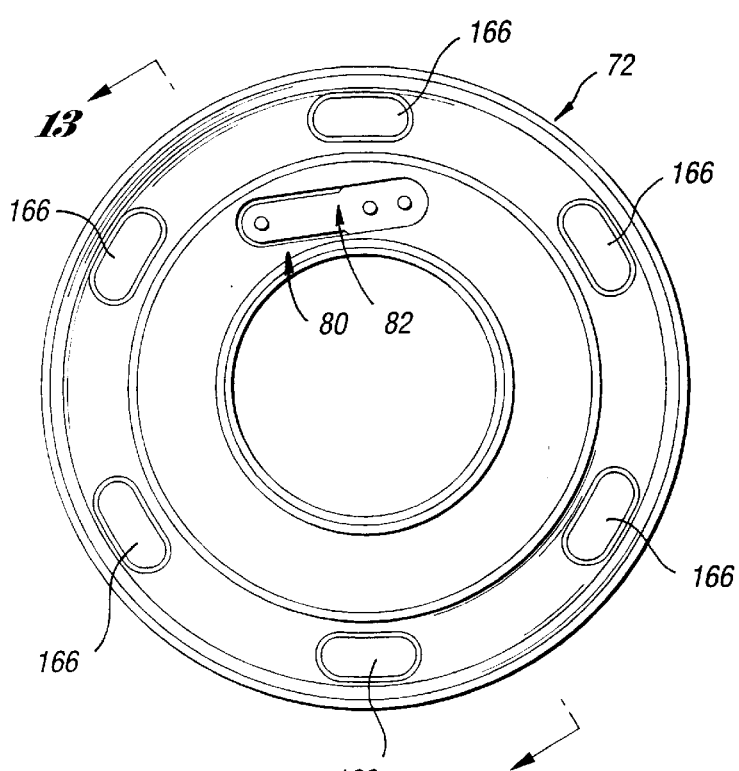
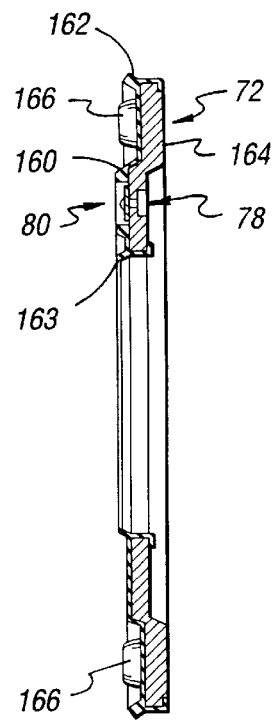
*Fig. 12*   *Fig. 13*
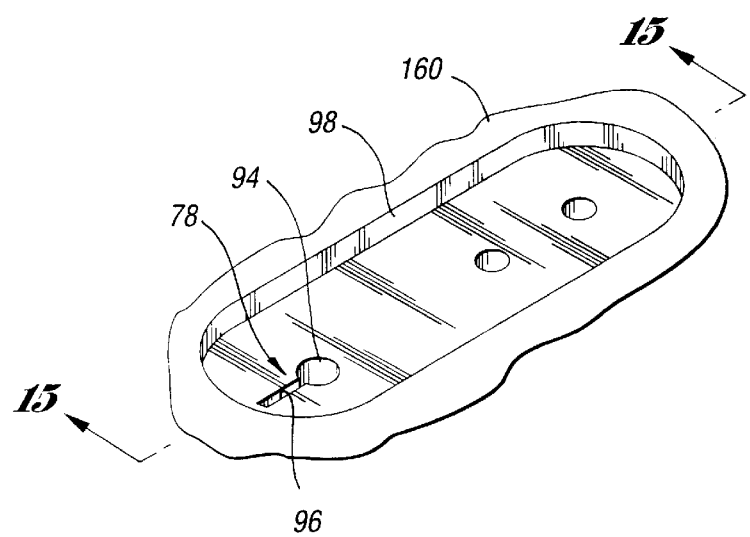
*Fig. 14*
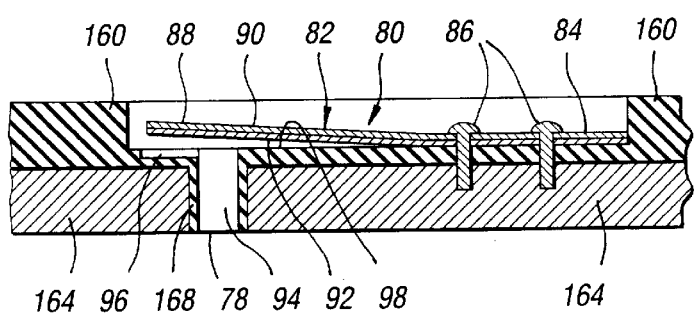
*Fig. 15*

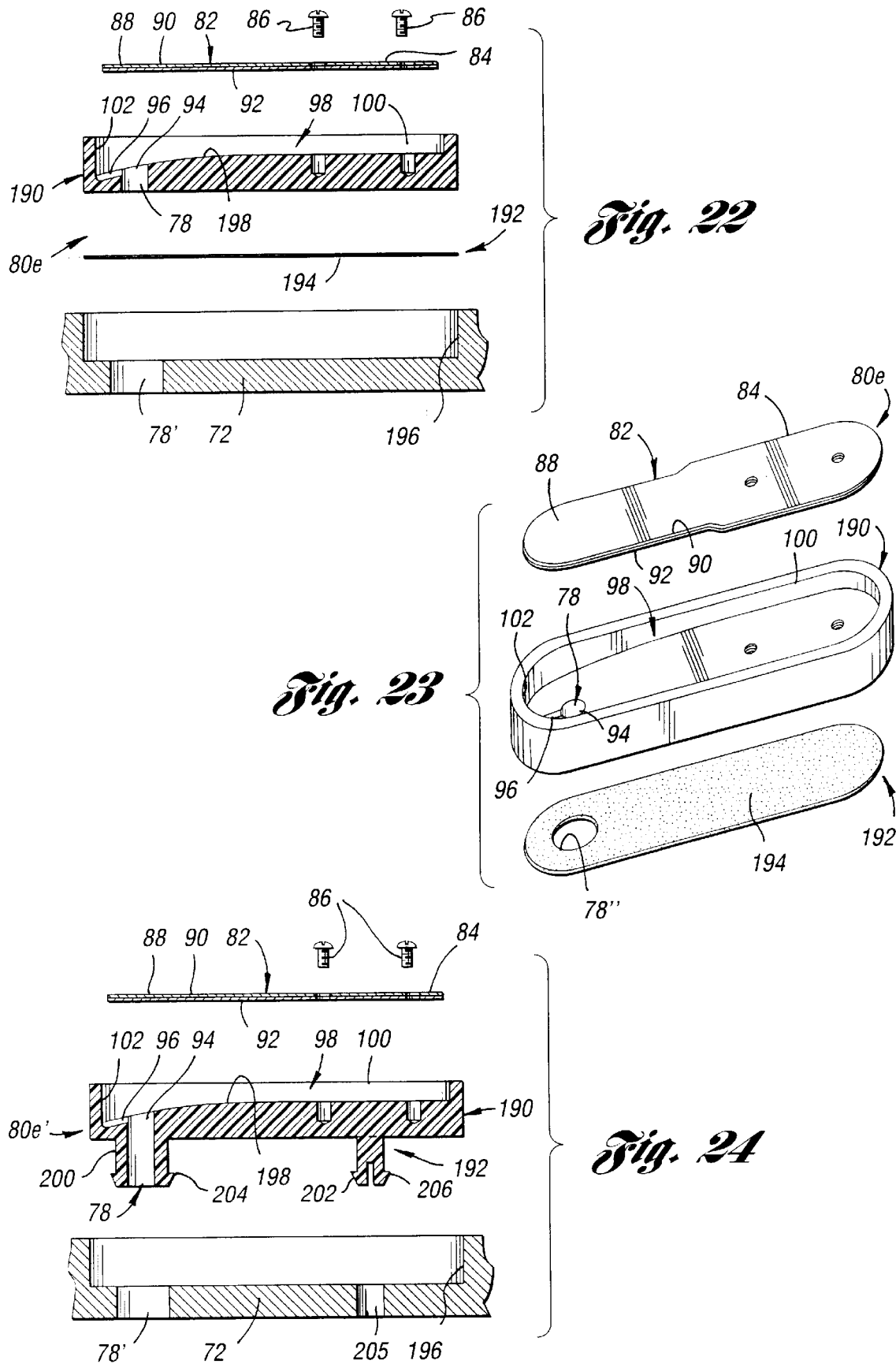

HYDRAULIC COUPLING HAVING SUPPLEMENTAL ACTUATION

TECHNICAL FIELD

This invention relates to a hydraulic coupling for use with a vehicle drive train within a housing thereof containing hydraulic fluid to rotatively couple a pair of rotary members about a rotational axis.

BACKGROUND ART

U.S. Pat. Nos. 5,310,388 Okcuoglu et al, 5,536,215 Shaffer et al, and 5,595,214 Shaffer et al disclose hydraulic couplings wherein a pair of rotary members are rotatively coupled to each other in response to differential rotation between the members. The coupling is performed through the use of a hydraulic pump that is operated by differential rotation of the pair of rotary members to be coupled. Pressurized fluid from the hydraulic pump causes closing of a control valve whereupon the pump couples the two rotary members.

DISCLOSURE OF INVENTION

An object of the present invention is to provide an improved hydraulic coupling that is operable to couple a pair of rotary members upon differential rotation and which also has a supplemental control for actuating the coupling of the pair of rotary members to each other.

In carrying out the above object, a hydraulic coupling of the invention is for use with a vehicle drive train within a housing thereof containing hydraulic fluid to rotatively couple a pair of rotary members about a rotational axis. The hydraulic coupling includes a casing of a hollow construction that is rotatable within a housing about the rotational axis. A hydraulic pump of the coupling is located within the casing along the rotational axis and includes a toothed impeller rotatively connected to one of the rotary members and having external teeth. The hydraulic pump also includes an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller as the pair of rotary members rotate relative to each other. An inlet port is provided through which hydraulic fluid is pumped from the housing into the casing by the hydraulic pump. A clutch of the coupling includes a piston chamber located within the casing and having an actuating piston that is received within the piston chamber and actuatable by pressurized hydraulic fluid to engage the clutch and couple the two rotary members to each other. The casing includes a transfer port through which the pressurized hydraulic fluid is pumped from the hydraulic pump to the piston chamber. The casing includes an outlet port through which pressurized hydraulic fluid flows from the piston chamber. A control valve of the coupling includes a valve element moveable between an open position spaced from the outlet port and a closed position that generally closes the outlet port when the pumped fluid reaches a predetermined pressure to thereby further increase the pressure of the pressurized hydraulic fluid actuate the piston and engage the clutch to thereby rotatively couple the pair of rotary members to each other. A supplement pressurized hydraulic fluid supply of the coupling provides for feeding of pressurized hydraulic fluid into the inlet port of the casing to the pump independent of pumping action of the pump.

The supplemental pressurized hydraulic fluid supply includes a rotary seal assembly that is fixedly mounted within the housing and has seals that seal with the casing to define an inlet chamber that communicates with the inlet port. A first passage feeds hydraulic fluid from the housing to the inlet chamber for flow through the inlet port upon pumping action of the hydraulic pump. The first passage has a check valve for preventing flow therethrough from the inlet chamber to the housing. A second passage provides for feeding pressurized hydraulic fluid from a source to the inlet chamber. The second passage of the supplemental pressurized hydraulic fluid supply as disclosed has a junction with the first passage thereof at a location toward the inlet chamber from the check valve of the first passage.

Different embodiments of the hydraulic coupling are disclosed. In one construction, the outlet port extends through the piston and the control valve is mounted on the piston. In another construction, the casing includes a wall that separates the pump and the piston chamber, with the transfer port extending through that casing wall from a high pressure side of the pump to the piston chamber, and with the outlet port extending through that casing wall from the piston chamber to a low pressure side of the pump.

One embodiment of the hydraulic coupling also includes a differential gear set that extends between the casing and the pair of rotary members. The hydraulic pump and the clutch of this embodiment are located within the casing adjacent one rotary member on one side of the differential gear set. The other rotary member in this embodiment is located on the opposite side of the differential gear set from the hydraulic pump and the clutch. This embodiment with the differential gear set has particular utility for use with a primary drive axle of a vehicle drivetrain.

Another embodiment of the hydraulic coupling includes a second hydraulic pump constructed generally the same as the first mentioned hydraulic pump and with the pair of hydraulic pumps respectively associated with the pair of rotary members extending along the rotational axis. More specifically, the second hydraulic pump is located within the casing along the rotational axis and includes a second toothed impeller rotatively connected to the other rotary member and having external teeth. The second hydraulic pump also includes a second internal ring gear mounted by the casing for rotation eccentrically with respect to the second toothed impeller and including internal teeth of a number one more than the external teeth of the second toothed impeller and in a meshing relationship therewith to provide a pumping action upon relative rotation between the casing and the second toothed impeller. This embodiment of the hydraulic coupling also includes a second inlet port through which hydraulic fluid is pumped into the casing by the second hydraulic pump. The clutch of this embodiment includes a second piston chamber located within the casing and having a second actuating piston that is received within the second piston chamber and actuatable by pressurized hydraulic fluid to engage the clutch and couple the two rotary members to each other. The casing includes a second transfer port through which the pressurized hydraulic fluid is pumped from the second hydraulic pump to the second piston chamber, and the casing also includes a second outlet port through which pressurized hydraulic fluid flows from the second piston chamber. A second control valve includes a second valve element movable between an open position spaced from the second outlet port and a closed position that generally closes the second outlet port when the pumped fluid reaches a predetermined pressure to thereby further increase the pressure of the pressurized hydraulic fluid and actuate the second piston and engage the clutch to thereby rotatively couple the pair of rotary members to each other.

The supplemental pressurized hydraulic fluid supply of this embodiment of the hydraulic coupling is operable to feed hydraulic fluid into the second inlet port of the casing to the second pump independent of pumping action of the second pump.

In the dual pump embodiment of the hydraulic, coupling, the clutch includes first and second clutch packs each of which includes a pair of sets of clutch plates that alternate with each other. One set of clutch plates of each clutch pack is rotatively fixed to the casing. The other set of clutch plates of the first clutch pack is rotatively fixed to the one rotary member, while the other set of clutch plates of the second clutch pack is rotatively fixed to the other rotary member. The clutch is located between the first mentioned piston and the second piston.

A further embodiment of the hydraulic coupling has one rotary member provided with an elongated shape extending along the rotational axis. The other rotary member of this embodiment of the hydraulic coupling has an annular shape and is mounted on the casing extending around the rotational axis.

The objects, features and advantages of the present invention are readily apparent from the following detailed description of the best modes for carrying out the invention when taken in connection with the accompanying drawings.

BRIEF DESCRIPTION OF DRAWINGS

FIG. 1a is a sectional view taken along the direction of line 1a—1a in FIG. 1 to illustrate one embodiment of the hydraulic coupling at the rear primary drive axle.

FIG. 7 is a partial sectional view that illustrates the construction of a control valve of the hydraulic coupling, with a valve element of the control valve shown in a solid line indicated open position with respect to an outlet port, and with the valve element shown in a phantom line indicated closed position with respect to the outlet port.

FIG. 8 is a perspective view that further illustrates the construction of the outlet port and the control valve.

FIG. 9 is an enlarged sectional view illustrating a the transfer port and an associated check valve through which hydraulic fluid is pumped to a clutch actuating piston.

FIG. 10 is a partial perspective view that further illustrates the transfer port check valve in its closed position.

FIG. 11 is a partial perspective view similar to FIG. 10 but with the transfer port check valve shown in its open position.

FIG. 12 is an axial view of one construction of the actuating piston of the clutch.

FIG. 13 is a sectional view of the actuating piston taken along the direction of line 13—13 in FIG. 12.

FIG. 14 is a perspective view illustrating the control valve outlet port which includes a main passage and a bleed passage and which is mounted within a recess.

FIG. 15 is a sectional view taken through the control valve generally in the direction of line 15—15 in FIG. 14 and also illustrates the valve element that controls fluid flow through the port illustrated.

FIG. 22 is an exploded sectional view taken in the same direction as FIG. 19 through another embodiment of the control valve wherein the valve element is flat and has an elongated straight shape and wherein the valve body has a recess whose port end is deeper than the location at which the valve element is mounted.

FIG. 23 is an exploded perspective view that further illustrates the embodiment of FIG. 22 which is mounted for use as illustrated in both of these views by an adhesive that is provided on a film.

FIG. 24 is a sectional view of a further modification of the control valve taken in the same direction as FIG. 22 and having the same construction except for mounting thereof that is provided by mechanical fasteners illustrated as being injection molded with the valve body.

BEST MODES FOR CARRYING OUT THE INVENTION

Figure 1:
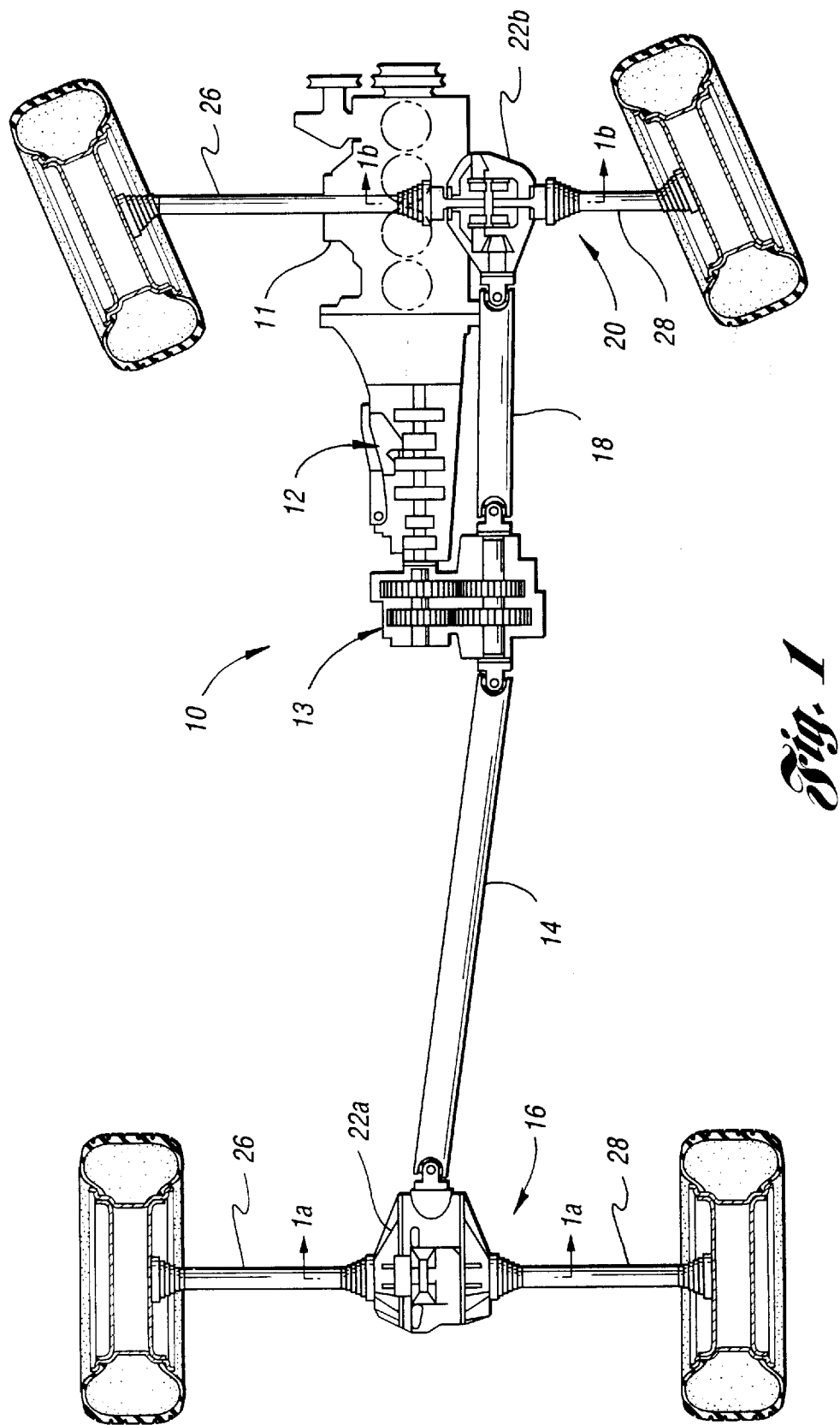
FIG. 1 is a schematic plan view of a vehicle drivetrain which includes a pair of hydraulic couplings constructed in accordance with the present invention and respectively located at a rear primary drive axle and at a front auxiliary drive axle.

With reference to FIG. 1 of the drawings, a vehicle drivetrain schematically indicated by 10 includes an engine 11 that drives a transmission 12 whose output is connected to a transfer case 13. A rear propeller shaft 14 has a front end rotatively driven by the transfer case 13 through a universal joint and has a rear end that drives a universal joint for rotatively driving the rear axle 16 which functions as the primary drive axle of the vehicle as illustrated. A front propeller shaft 18 has a rear end rotatively driven by the transfer case 13 through a universal joint and has a front end that drives a universal joint for rotatively driving the front axle 20 which functions as an auxiliary drive axle for providing four wheel driving of the vehicle when needed. The rear axle includes a differential 22a for transmitting torque while the front axle includes an axle unit 22b for transmitting torque as is hereinafter more fully described.

With reference to FIG. 1a of the drawings, the differential 22a of a rear axle 16 is rotatively driven by a rotary drive member 24. The differential 22a operates to drive a pair of axle half shafts 26 and 28 of the rear axle 16 such that these shafts respectively embody a pair of rotary members which rotate about a common rotational axis A. The differential 22a includes a housing 30 for containing hydraulic fluid and having suitable unshown seals through which the rotary members 24, 26, and 28 project. Within the housing 30, the differential 22a includes a hydraulic coupling 32a that operates to rotatively couple the axle half shafts 26 and 28 driven by the rotary drive member 24 as is hereinafter more fully described.

With continuing reference to FIG. 1a, the hydraulic coupling 32a includes a casing 34 of a hollow construction that is rotatable within the housing about the rotational axis A and connected to axle half shaft type rotary members 26 and 28 by a planetary gear set that is shown as a bevel gear type differential gear set 36 as is hereinafter more fully described. Casing 34 as illustrated includes a cup-shaped member 38 and a cap member 40 which each have peripheral flanges secured to each other by circumferentially spaced bolts 42 that also secure a ring gear 44 of the bevel type which is rotatively driven by a bevel driving portion 46 of the rotary drive member 24.

Figure 2:
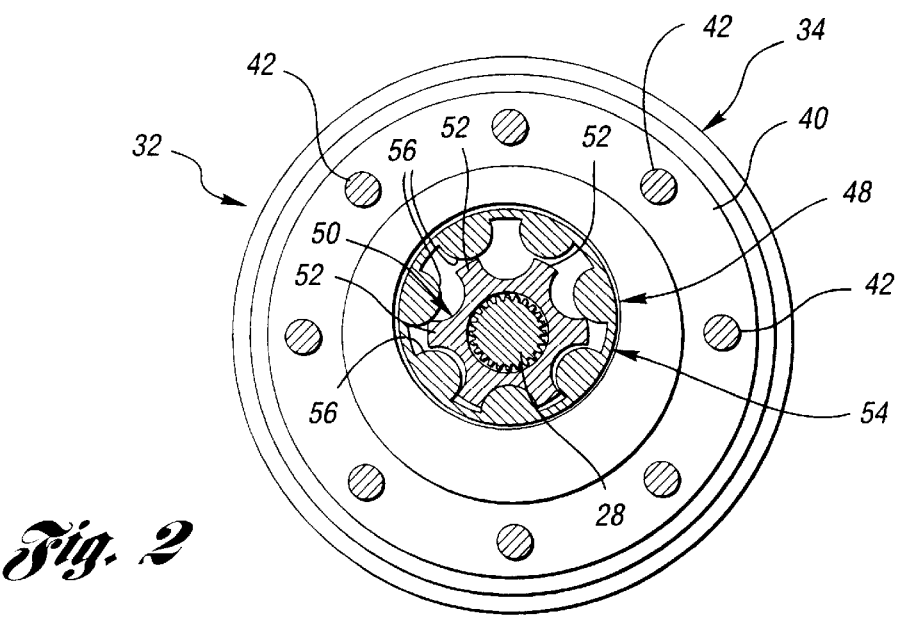
FIG. 2 is a sectional view taken through a pump of the embodiment of the hydraulic coupling shown in FIG. 1a along the direction of its line 2—2 and discloses the pump as having an impeller with six teeth meshed with an internal ring gear having seven teeth to provide a pumping action that allows the pump to have relatively constant pumping pressure that facilitates actuation of an associated clutch without fluid pressure pulsation.
Figure 3:
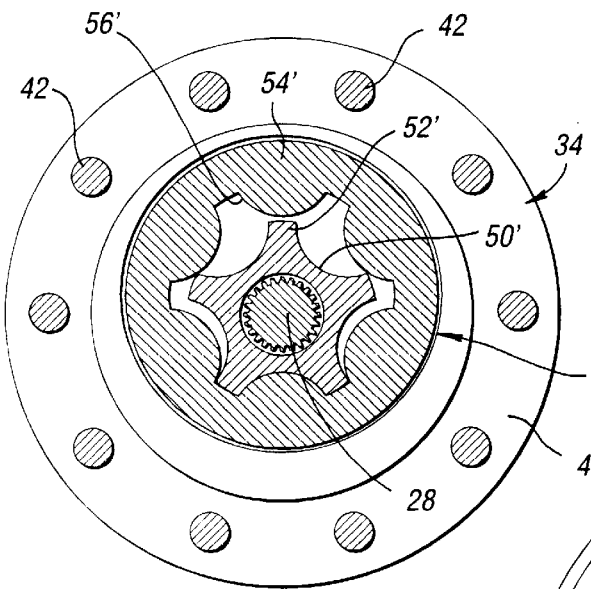
FIG. 3 is a view similar to FIG. 2 to illustrate that the pump can also have its impeller provided with five teeth and its internal ring gear provided with six teeth when a greater pumping capacity is desired.
Figure 4:
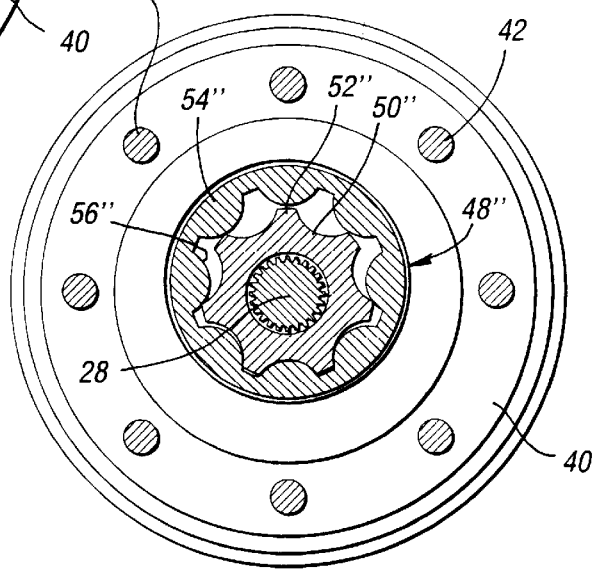
FIG. 4 is a view similar to FIGS. 2 and 3 but illustrating the impeller as having seven teeth and the internal ring gear as having eight teeth when a more constant fluid pressure is desired.

With combined reference to FIGS. 1a and 2, the hydraulic coupling 32a also includes a hydraulic pump 48 located within the casing 34 along the rotational axis A and including a pumping component embodied by a toothed impeller 50 having external teeth 52. The hydraulic pump also includes an internal ring gear 54 mounted by the casing 34 for rotation eccentrically with respect to the toothed impeller 50 and including internal teeth 56 of a number that is one more than the impeller teeth and which are in a meshing relationship with the impeller teeth to provide a pumping action upon relative rotation between the casing and the toothed impeller. As is hereinafter more fully described, the impeller 50 most preferably has six teeth 52 and the internal ring gear 54 has seven teeth 56 which is a relationship that provides sufficient pumping capacity so that the hydraulic pump can act effectively as a brake while still having relatively constant pumping pressure without fluid pulsation that would adversely affect the hydraulic coupling provided between the rotary members. As shown in FIG. 3, it is also possible for the hydraulic pump 48' to have its impeller 50' provided with five external teeth 52' and for the ring gear 54' to have six teeth 56' meshed with the impeller teeth which is a construction that will provide a somewhat greater pumping capacity but less consistency in the fluid pressure but not so inconsistent as to interfere with effective hydraulic coupling between the rotary members. Likewise as illustrated in FIG. 4, it is also possible for the hydraulic pump 48" to have its impeller 50" provided with seven external teeth 52" and its internal ring gear 54" to have eight internal teeth 56" when more consistent fluid pressure is desirable even though there is an accompanying decrease in the amount of pumped fluid. Thus, the impeller preferably has between five and seven external teeth with six being most preferable while the internal ring gear has one more tooth than the number of impeller teeth utilized.

Figure 5:
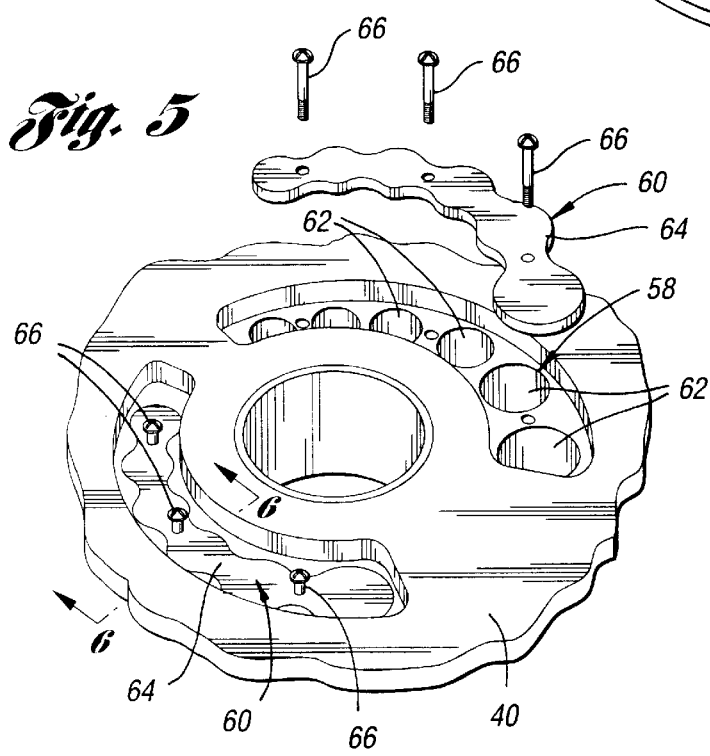
FIG. 5 is an exploded perspective view illustrating the construction of inlet valves for inlet ports through which hydraulic fluid is pumped into a casing of the coupling.
Figure 6:
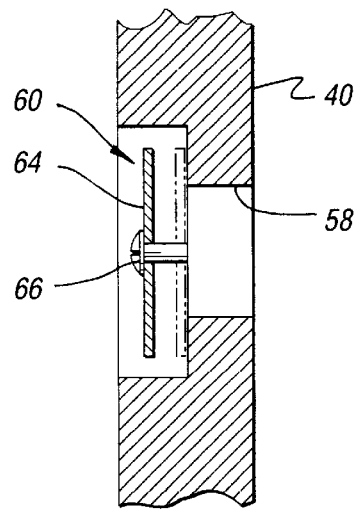
FIG. 6 is a sectional view taken along the direction of line 6—6 in FIG. 5 to illustrate the opening and closing operation of the inlet valve.

With combined reference to FIGS. 1a, 5 and 6, the casing 34 has an inlet 58 through which hydraulic fluid is pumped into the casing by the hydraulic pump 48. As illustrated in FIG. 1, there are actually two of the inlets 58 such that the pumping takes place in both directions of relative rotation between the rotary members embodied by the axle half shaft 26 and by the axle half shaft 28 as well as the casing 34. In this connection, each of the inlets 58 includes an associated check valve 60 for opening and closing inlet bores 62 of varying size along the direction of rotation. Each check valve 60 as shown in FIGS. 5 and 6 has a thin valve element 64 that is mounted by guides such as the threaded bolts 66 shown for movement between the solid line indicated open position of FIG. 6 and the phantom line indicated closed position. Upon one direction of relative rotation between the impeller 50 and the casing 34 shown in FIG. 2, one of the check valves 60 opens to permit the hydraulic fluid to be pumped from the housing 30 into the casing 34 while the other check valve 60 is then closed so that the hydraulic fluid is not pumped out of the casing through the other inlet port. During the opposite direction of relative rotation between the impeller 50 and the casing 34, the open and closed positions of the inlet ports 58 are reversed.

As illustrated in FIG. 1a, a clutch 68 is received within the cup-shaped member 38 of casing 34 adjacent the junction thereof with the cap member 40 of the casing. Within the casing cap member 40, a pump housing insert 70 of the casing is mounted and receives the hydraulic pump 48 as well as interfacing with the clutch 68. This insert 70 has an annular piston chamber 71 that receives a clutch actuating piston 72 that engages the clutch 68 as is hereinafter more fully described to couple the casing 34 with the left axle half shaft 26 as is also hereinafter more fully described. Insert 70 also has a wall 70' that separates the hydraulic pump 48 from the piston chamber and defines at least two transfer ports 74 through which hydraulic fluid is pumped from a high pressure side of the hydraulic pump 48 to the clutch actuating piston 72 within the piston chamber 71. This flow through the transfer ports 74 is through one of the transfer ports upon one direction of relative rotation between the impeller 52 and the ring gear 54 and is through the other transfer port 74 during the other direction of relative rotation between the impeller and the ring gear. Each of the transfer ports 74 has an associated check valve 76 of a construction that is hereinafter more fully described in connection with FIGS. 1a through 11. These check valves 76 ensure that the hydraulic fluid pumped from the high pressure side of the pump through either transfer port to the clutch actuating piston 72 is not pumped back to the low pressure side of the hydraulic pump 48 through the other transfer port.

As best illustrated in FIGS. 7 and 9, an outlet port 78 is also provided and in the coupling embodiment of FIG. 1a is located on the clutch actuating piston 72. A control valve 80 of the coupling controls fluid flow through the outlet port 78. More specifically, the pumped hydraulic fluid increases in pressure in response to increased relative rotation between the pump impeller and the ring gear and thus corresponds to the relative rotation between the left and right axle half shafts 26 and 28. As the pumped hydraulic fluid reaches the predetermined pressure, the valve 80 closes as is hereinafter more fully described to close the outlet port 78 and thus prevent the hydraulic fluid from being pumped from the hydraulic pump 48. This valve closing further increases the pressure of the pumped hydraulic fluid due to torque transfer between the axle half shafts 26 and 28. The fluid pressure causes the hydraulic pump 48 to act as a brake by coupling the impeller 52 with the internal ring gear 54 and also causes the piston 72 to actuate the clutch 68 such that the left and right axle half shafts are coupled to each other through the casing 34 as the clutch locks out any differential action of the differential gear set 36.

As best illustrated in FIGS. 7 and 8, the valve 80 includes an elongated metallic strip valve element 82 having one portion or end 84 that is mounted in a spaced relationship to the outlet port 78 in any suitable manner such as by the headed bolts 86 illustrated. Valve element 82 also has a distal end 88 that is movable between a solid line indicated open position spaced from the outlet port 78 as shown in FIG. 7 and a phantom line indicated closed position that closes the outlet port. This valve element 82 is of the bimetallic type and thus includes two metals 90 and 92 that have different coefficients of thermal expansion so as to cause the valve element to move as its temperature is raised and lowered. More specifically, as the hydraulic fluid is heated such as during continued usage, the valve element end 88 moves toward the outlet port 78 with the net result being that the less viscous fluid will close the valve 80 at the same pressure of pumped fluid corresponding to the same amount of relative rotation between the axle half shafts. Furthermore, upon cooling of the hydraulic fluid such as after rest for a certain period of time, the valve element end 88 moves away from the outlet port 78 such that the valve closes at the same pressure of pumping of the more viscous hydraulic fluid. Thus, the bimetallic valve element 82 is temperature compensated as it compensates for viscosity changes as the hydraulic fluid is heated and cooled to ensure that the coupling between the two rotary members embodied by the two axle half shafts takes place at the same rate of relative rotation. More specifically, the valve closing as discussed above causes the hydraulic pump 48 to then function as a brake that limits the relative rotation between the two rotary members embodied by the two axle half shafts and also causes the actuation of the clutch 68 to further couple the two axle half shafts to each other.

As further illustrated in FIGS. 7 and 8, the outlet port 78 preferably includes a main passage 94 that is closed by the valve element 82 as its end 88 moves from the open position to the closed position as previously described. Outlet port 78 also includes a bleed passage 96 that remains open even when the valve element 82 is closed with respect to the main passage 94 in order to provide a bleed flow of hydraulic fluid that cools the clutch 68 and also ensures that the pressure of the hydraulic fluid within the pump 48 does not excessively increase at an uncontrolled rate. When the valve element 82 opens, the fluid flow through both passages of the outlet port 78 provides cleaning of the bleed passage 96 to remove any small particles that might block the smaller cross-sectional flow area of the bleed passage. The control valve 80 is thus self cleaning during normal usage. Also, the bleed passage 96 allows pressurized fluid to flow from the piston chamber 71 when the hydraulic pumping stops as the pair of rotary members cease to rotate relative to each other, and the clutch 68 is disengaged as the pressure in the piston chamber drops as is hereinafter more fully described. In this construction of the control valve 80, the bleed passage 96 is defined by the valve body provided by the piston 72 (FIG. 7) on which the valve element 82 is mounted.

As shown in FIGS. 7 and 8, the coupling includes an elongated mounting recess 98 having one portion or end 100 at which the one end 84 of the valve element 82 is mounted and having another end 102 at which the main passage 94 and bleed passage 96 of the outlet port 78 are located. This recess in cooperation with the bimetallic valve element 82 provides a continually varying change in the cross-sectional flow area of flow to the outlet port 78 from the other side of the valve element such that movement of the valve element end 88 in response to temperature changes provides an accurate control of the pressure at which the valve element closes to initiate the operation of the hydraulic pump as a brake and the actuation of the clutch. For any given predetermined open position of the valve element 82, there is a certain pressure at which the hydraulic fluid of a certain velocity will cause closure of the valve element. This results from the flow of the hydraulic fluid between the valve element end 88 and the adjacent end of the recess 102 to the outlet port 78. This flow causes a pressure drop in the fluid upon passage past the valve element end 88 so that there is less force acting on the outlet side of the valve element end 88 than on the hydraulic pump side which are respectively the lower and upper sides as illustrated in FIG. 7. Movement of the valve element 82 to change the position of its end 88 in response to temperature changes varies the cross-sectional area of flow between this valve element end and the recess end 102 so as to thereby accurately compensate for temperature changes and ensure that the closure of the valve 80 corresponds to the same rate of relative rotation between the rotary members embodied by the axle half shafts 26 and 28 shown in FIG. 1a.

With reference to FIG. 1a, the hydraulic coupling 32a includes a supplemental pressurized hydraulic fluid supply 103 for feeding pressurized hydraulic fluid into the inlet port 58 of the casing 34 to the pump 48 independent of pumping action of the pump. More specifically, the supplemental pressurized hydraulic fluid supply 103 includes a rotary seal assembly 104 including a member 105 having schematically illustrated fixed connections 105a to the casing to define an inlet chamber 105b that has a generally annular shape extending about the adjacent rotary member 26. The rotary seal assembly 104 also includes rotary seals 106 that have annular shapes and seal between the member 105 and the casing 34 at its cap member 40 as previously described. These seals 106 can be fixed to either the member 105 so as to slide with respect to the casing cap member 40 or can be fixed to the casing cap member 40 so as to slide with respect to the seal assembly member 105.

With continuing reference to FIG. 1a, a suitable conduit member provides a first passage 107 having a lower portion 107a for feeding hydraulic fluid from a lower sump portion of the differential housing 30 to the inlet chamber 105b for flow through the inlet port 58 upon pumping action of the hydraulic pump 48. This first passage 107 also has a check valve 107b for flow therethrough from the inlet chamber 105b to the differential housing 30. A second passage 108 is also provided for feeding pressurized hydraulic fluid to the inlet chamber 105b. The supplemental pressurized hydraulic fluid supply 103 also includes a source 109 of pressurized hydraulic fluid that will normally be embodied by an electric pump that is selectively operated to provide pressurized hydraulic fluid through the second passage 108 to the inlet chamber. It should also be appreciated that the pump source 109 can also be driven by a take-off from the associated vehicle engine or an accessory driven by the engine or by vehicle travel. A passage 109*a* feeds hydraulic fluid from the lower sump portion of the differential housing 30 to the pump source 109 for flow through the second passage 108 to the inlet chamber 105*b*. This second passage 108 has a junction 110 with the first passage 108 at a location toward the inlet chamber 105*b* from the check valve 107*b* of the first passage 107 such that pressurized hydraulic fluid from the pump source 109 does not flow back into the lower sump portion of the differential housing 30 after being pressurized but rather flows to the inlet chamber 105*b* for flow to the hydraulic pump 48 through the inlet port 58. A control 111 which is hereinafter more fully described has a suitable connection 111*a* to the pump source 109 to control its operation and the consequent flow of pressurized flow to the hydraulic pump 48 independent of its pumping operation.

Before proceeding with a more detailed description of the operation of the supplemental pressurized hydraulic fluid supply 103, additional structure of the hydraulic coupling will first be set forth to facilitate an understanding of the operation that provides coupling between the pair of rotary members 26 and 28.

With reference to FIG. 1*a*, the hydraulic coupling 32*a* has the clutch 68 extending between the left axle half shaft 26 and the casing 34. This clutch 68 includes alternating sets of clutch plates 112 and 114 with the one set of clutch plates 112 having outer peripheries with spline connections 116 to the casing 34, and with the other set of clutch plates 114 having a central opening with spline connections 118 to the left axle half shaft 26 which also has spline connections 120 to the pump impeller 50 on the opposite side of the insert 70 from the clutch. Pumped hydraulic fluid acting on the clutch piston 72 as previously described compresses the sets of clutch plates 112 and 114 to provide the coupling between the casing 34 and the rotary member embodied by the axle half shaft 26. Pumped hydraulic fluid that flows through the actuating piston 72 through the bleed passage of the outlet port previously described then flows along the axle half shafts 26 and 28 for passage out of the casing 34.

As previously mentioned, the hydraulic coupling 32*a* illustrated in FIG. 1 has the planetary gear set embodied by the bevel type differential gear set 36 connecting the casing 34 and the rotary members embodied by the left and right axle half shafts 26 and 28. This differential gear set 36 is positioned on the opposite side of the clutch 68 from the hydraulic pump 48 and includes a pair of bevel side gears 124 and 126 which have respective spline connections 128 and 130 to the rotary members embodied by the axle half shafts 26 and 28. Planet gears 132 of the differential gear set 36 are each meshed with the pair of side gears 124 and 126 and are rotatably supported by a cross pin 134 that extends through the rotational axis A between opposite sides of the casing 34. The differential gear set 36 provides a differential action between the rotary members embodied by the axle half shafts 26 and 28 until closure of the valve 80 causes the hydraulic pump 48 to function as a brake and also actuate the clutch 68 as previously described whereupon the axle half shaft 26 is coupled through the spline connections 128, side gear 124, planet gears 132 supported by the cross piece 134 and hence the casing 34, side gear 126 and the spline connections 130 with the other axle half shaft 28.

It should also be noted in connection with FIG. 1*a* that the differential gear set 36 upon transferring of torque between the rotary members embodied by the axle half shafts 26 and 28 causes a spreading action that moves the one bevel side gear 124 toward the clutch 68 to compress the clutch plates 112 an 114 thereof in the same way that the piston 72 compresses the clutch so as to thereby provide clutch actuation that also couples the axle half shafts to each other.

Figure 1B:
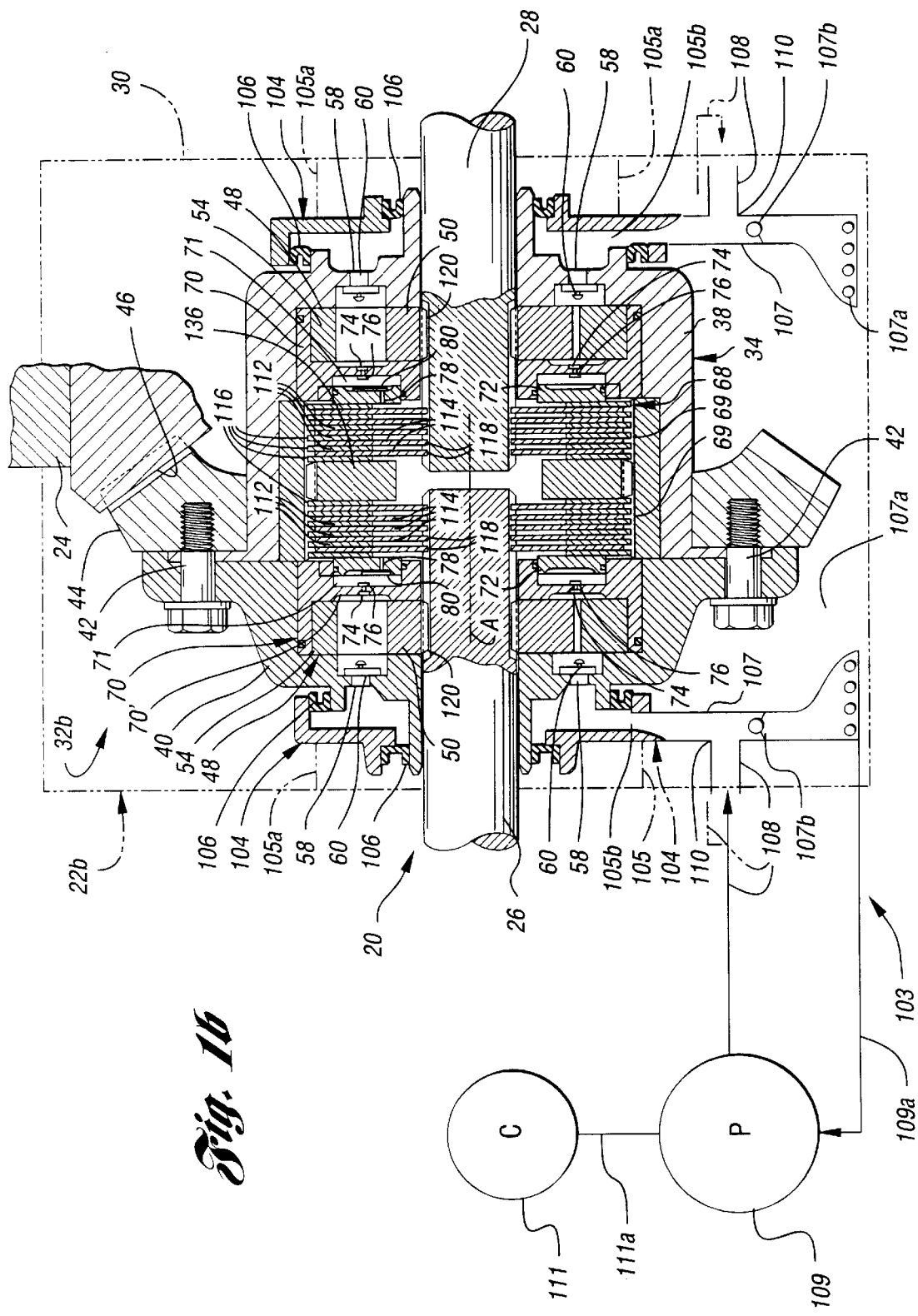
FIG. 1b is a sectional view taken along the direction of line 1b—1b of FIG. 1 through the other embodiment of the hydraulic coupling at the front auxiliary drive axle.

With reference to FIG. 1*b*, the axle unit 22*b* of the front axle includes another embodiment of the hydraulic coupling 32*b* that has a similar construction to the previously described embodiment except as will be noted and thus has like reference numerals applied to like components thereof such that much of the previous description is applicable and need not be repeated. This embodiment of the hydraulic coupling 32*b* provides coupling without any differential gear set between the rotary members embodied by the front axle half shafts 26 and 28. Each front axle half shaft 26 and 28 has an associated hydraulic pump 48 and the clutch 68 has first and second clutch packs 69 each of which includes a pair of sets of clutch plates 112 and 114 that alternate with each other. One set of clutch plates 112 of each clutch pack 69 is rotatively fixed to the casing 34 by the spline connections 116. The other set of clutch plates 114 of the first clutch pack 69 shown on the left is rotatively fixed by the spline connections 118 to the one rotary member embodied by the left axle half shaft 26. The other set of clutch plates 114 of the second clutch pack 69 shown on the right is rotatively fixed by the spline connections 118 to the other rotary member embodied by the right axle half shaft 28.

With continuing reference to FIG. 1*b*, the hydraulic coupling 32*b* includes a pair of the inserts 71 with one such insert being supported by the casing cap member 40 at one end of the coupling adjacent the rotary member embodied by the left axle half shaft 26 and with the other end supported by the cup-shaped member 38 of the casing adjacent the other rotary member embodied by the right axle half shaft 28. Each insert 71 supports the associated hydraulic pump 48 whose toothed impeller 50 is secured by the splined connection 120 to the associated axle half shaft 26,28. Each insert 70 also defines the associated piston chamber 71 and receives an associated piston 72 such that there are first and second pistons in this embodiment located on opposite sides of the clutch 68. The insert defines the transfer valve 74 through which pressurized fluid from the high pressure side of the pump 48 is pumped into the associated piston chamber 71 as is hereinafter more fully described. The casing cap member 40 defines the one inlet port 58 with the associated valve 60 while the cup-shaped member 38 of the casing defines a second inlet port 58 with an associated valve 60. Each piston 72 of this embodiment has an outlet port 78 and supports an associated control valve 80 of the construction previously described. These control valves have valve elements that are movable between an open position spaced from the associated outlet port and a closed position that generally closes the associated outlet port when pumped fluid reaches a predetermined pressure to thereby further increase the pressure of the pressurized hydraulic fluid and actuate the associated piston to engage the clutch. Such clutch engagement rotatively couples the pair of rotary members embodied by the left and right axle half shafts 26 and 28 to each other.

The supplement pressurized hydraulic fluid supply 103 of this embodiment has the same construction as the previously described embodiment illustrated in FIG. 1*a* but includes another seal assembly 104 associated with the right end of the coupling in addition to the seal assembly 104 associated with the left end of the coupling. Thus, in this embodiment, the pressurized hydraulic fluid from the pump source 109 feeds pressurized hydraulic fluid through the second passage 108 to the first and second inlet chambers defined by the members 105 and their associated seals 106 so that both hydraulic pumps 48 are fed the pressurized hydraulic fluid under the operation of the control 111. This selective supplemental supply of the pressurized hydraulic fluid to the pumps 48 is in addition to the hydraulic fluid pumped through the lower portion 107a of the first passage 107 associated with each seal assembly 104 in response to differential rotation between the rotary members embodied by the axle half shafts 26 and 28.

With the embodiments of FIG. 1a and 1b, the outlet port 78 and each associated control valve 80 is located on the piston 72. As such, the flow of hydraulic fluid through the bleed passage of the outlet port 78 cools the clutch 68.

The following description of the insert 70 that defines the transfer port 74 and the piston 72 through which the outlet port 78 extends under the control of the associated control valve 80 will be set forth in connection with FIGS. 9–15.

With reference to FIGS. 9 through 11, each transfer port 74 extends through the wall 70' of the insert 70 from the pump side toward the piston side and has the associated check valve 76 mounted on the piston side where the piston is sealed between inner and outer annular flanges 142 and 144 by suitable seals such as the O-rings 146 and 148 shown. On the pump side, the transfer port 74 has an enlarged shallow collection portion 150 that allows the pumped hydraulic fluid to be received from different circumferential locations about the rotational axis for eventual flow through the transfer port and the check valve 76 in the piston side in order to provide the piston actuation as previously described. As best illustrated in FIGS. 10 and 11, each check valve 76 includes a metallic strip valve element 152 having one end 154 mounted on the metallic insert by suitable fasteners 156 such as the headed bolts shown and has another distal end 158 that is normally biased to the closed position of FIG. 10 by a resilient spring force of the valve element. However, the pressurized fluid upon pumping acts against the spring bias to provide opening of the valve distal end 158 as shown in FIG. 11 to permit the fluid flow that moves the piston and actuates the clutch as previously described.

It should be noted that the cross-sectional flow area through the transfer port 74 shown in FIG. 9 and the cross-sectional flow area through the outlet port of the open control valve 80 shown in FIGS. 7 and 8 are normally tuned to be approximately equal to each other. Tuning of the coupling can also be performed by making the cross-sectional flow area of the transfer port 74 smaller than the cross-sectional flow area of the open control valve 80 to delay the control valve closing and the consequent actuation of the clutch 68. Furthermore, faster control valve closing and consequent clutch actuation can be achieved by making the cross-sectional flow area of the transfer port 74 larger than the cross-sectional flow area of the open control valve 80. In addition, it may also be possible to tune the operation by controlling the closing spring bias of the transfer port valve element 152.

With reference to FIGS. 12 and 13, another embodiment of the piston 72 of the hydraulic coupling is illustrated as having the control valve 80 mounted thereon as previously described and also is shown as having a coating 160 of an elastomeric rubber-like material, such as for example an ethylene acrylic resin, on its one side which faces the hydraulic pump in the assembled condition. This coating 160 also defines outer and inner annular seals 162 and 163 for sealing with the adjacent outer and inner annular walls of the coupling insert 70 to provide a slidably sealed relationship. This coating 160 is injection molded to a stamped steel plate 164 of the piston 72 and also has positioning lugs 166 spaced circumferentially about its periphery so as to protect the seals 162 and 163 when the piston moves to its full extent toward the left within the casing of the coupling.

With additional reference to FIGS. 14 and 15, the coating 160 is injection molded to define the outlet port 78 with its main passage 94 and bleed passage 96 previously described as well as to define the mounting recess 98 in which the valve element 82 of the control valve 80 is mounted as specifically shown in FIG. 15. Injection molding of the coating facilitates the provision of the outlet port 78 with its main passage 94 and bleed passage 96. Furthermore, it should be noted the coating 160 may have an annular portion 168 that extends through a hole in the piston plate 164 to readily define the required cross-sectional flow area of the main passage 94 of the outlet port 78 to thereby also facilitate tuning of the coupling as described above.

Figure 1C:
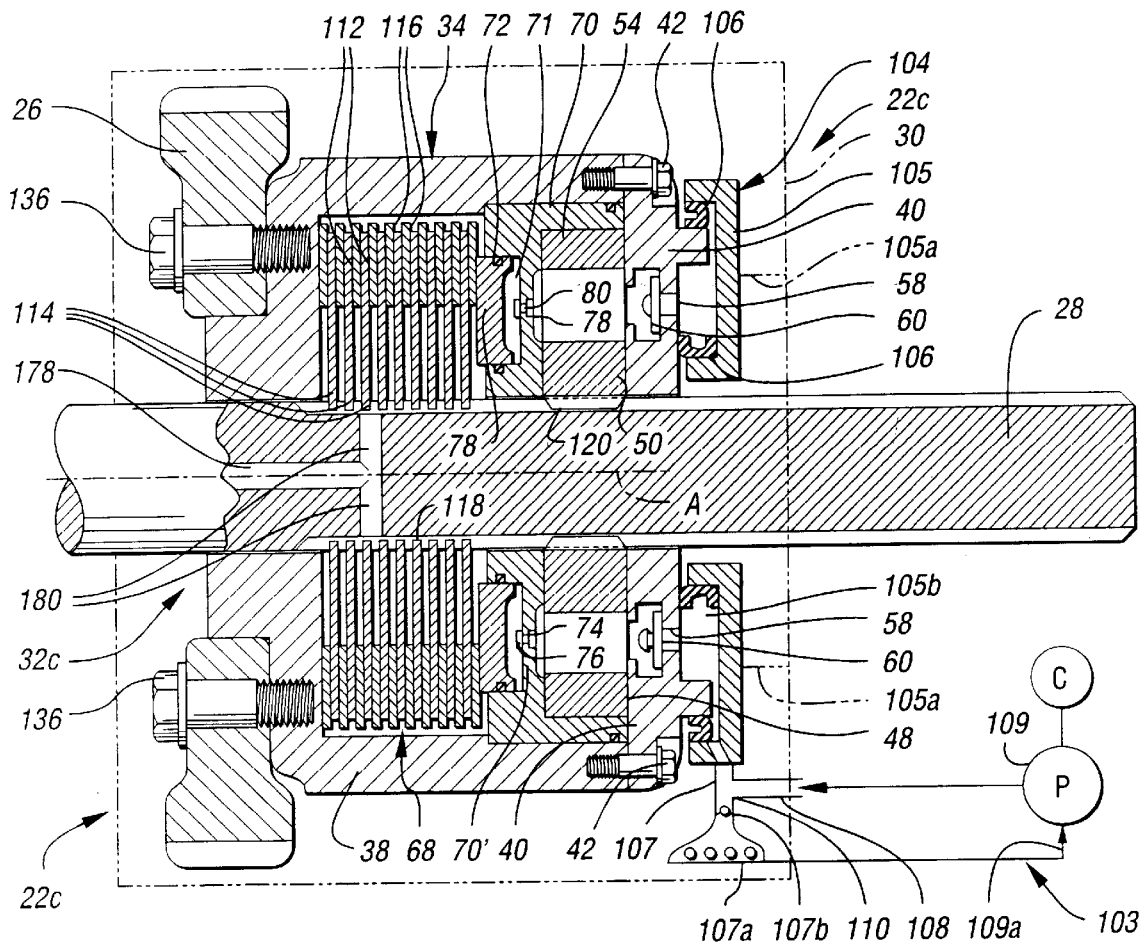
FIG. 1c is a view similar to FIGS. 1a and 1b of a further embodiment of the hydraulic coupling.

With reference to FIG. 1c, a coupling unit 22c includes another embodiment of the hydraulic coupling 32c and includes components that are identical to the previously described embodiments except as will be noted such that like reference numerals are applied thereto and much of the previous description is applicable and need not be repeated. However, the hydraulic coupling 32c has the rotary member 26 provided with a fixed bolt connection 138 to the casing 34. This rotary member 26 has a ring shape through which the rotational axis A extends, and the other rotary member 28 has an elongated shape that extends through the casing 34 and through the ring shape of the one rotary member 26. The hydraulic pump 48 and clutch 68 are located within the casing 34 and operate in the same manner as the previously described in connection with the embodiment of FIG. 1a except for the fact that there is no associated differential gear set. During use, the one rotary member 26 can provide a take off for auxiliary axle driving while the other rotary member 28 provides the driving between the vehicle engine and the primary drive axle. However, when there is a difference in rotational speed between the axles, the operation of the hydraulic coupling 32c then couples the axles to each other by pump and clutch operation in the same manner previously described. Furthermore, the supplemental pressurized hydraulic fluid supply 103 has the same construction and components as the embodiment of FIG. 1a such that the previous description is applicable and need not be repeated.

It should be noted that the coupling 32c illustrated in FIG. 1c differs from the couplings 32a and 32b respectively illustrated in FIGS. 1a and 1b in that the wall 70' of the casing insert 70 separating the hydraulic pump 48 from the clutch 68 has both the transfer port 74 and the outlet port 78 extending therethrough as opposed to the other two embodiments where the outlet prot extends through the actuating piston associated with the clutch. This construction provides a supercharged circuit as described below.

Figure 16:
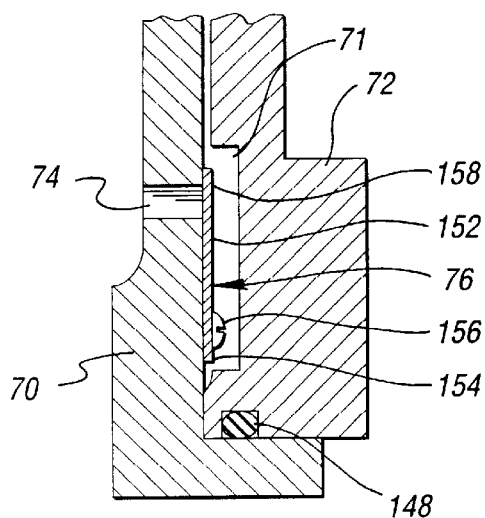
FIG. 16 is a partial view that illustrates a valved transfer port of a supercharged circuit provided by the FIG. 1c embodiment of the hydraulic coupling.
Figure 17:
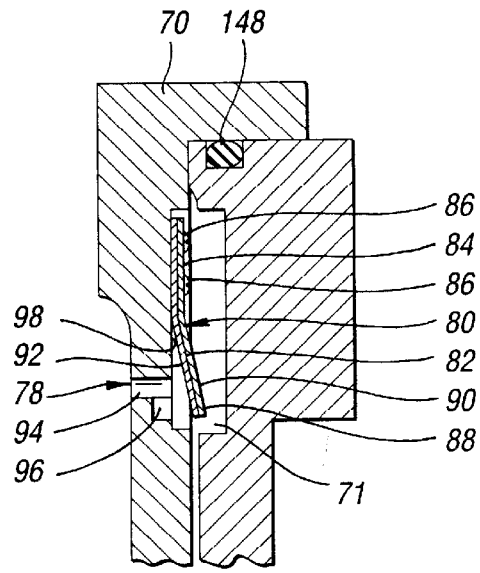
FIG. 17 is a view that illustrates the control valve for the outlet port of the supercharged circuit.
Figure 18:
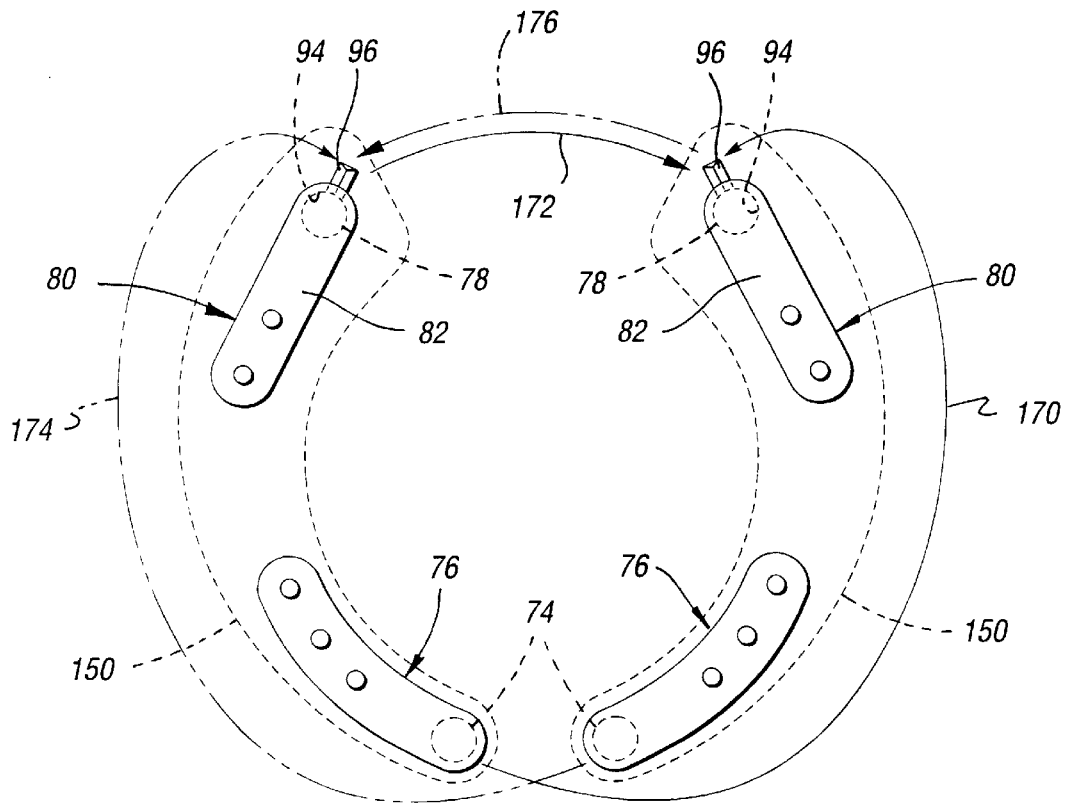
FIG. 18 is a schematic view that illustrates the fluid flow of the supercharged circuit.

More specifically as illustrated in FIGS. 16–18, two sets of transfer and outlet ports 74 and 78 with associated check valves 76 and control valves 80 are provided with each set located within an associate collection portion 150 on the pump side of the insert wall through which the ports extend. During one direction of relative rotation between the rotary members 26 and 28 (FIG. 1c), the pumped hydraulic fluid flows from the hydraulic pump through the left transfer and outlet ports 74 and 78 shown in FIG. 18 to the piston chamber for flow to the right outlet port 78 back to the low pressure side of the pump as illustrated by the two solid line indicated arrows 170 and 172. During the other direction of relative rotation between the pair of rotary members, the hydraulic fluid flows from the pump through the right transfer and outlet ports 76 and 78 into the piston chamber for flow to the left outlet port 78 as shown by the phantom line indicated arrows 174 and 176. As such, there is a continual pumping during relative rotation between the pair of rotary members from the hydraulic pump to the piston chamber 71 to provide actuation of the clutch 68 while the hydraulic fluid is then pumped back to the low pressure side of the hydraulic pump for further pressurization.

With the FIG. 1c embodiment of the hydraulic coupling 32d, there is no flow of the hydraulic fluid to the clutch plates 112 and 114. As such, it is desirable to have a lubricating passage 178 as shown for providing lubrication to the clutch plates. This lubrication passage 178 includes passage portions 180 through the rotary member 28 to the clutch plates 112 and 114 to the adjacent the spline connections 118 of the clutch plates 114 to the rotary member 28. Flow through these passage portions 178 and 180 of the lubricating passage 178 from a suitable pumped source thus provides lubrication that functions as a coolant for the clutch plates 112 and 114 on the clutch side of the piston 72.

Figure 19:
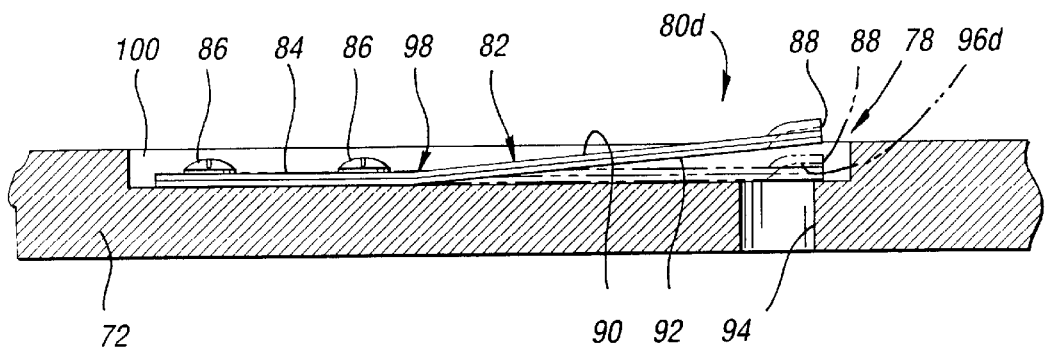
FIG. 19 is a sectional view similar to FIG. 7 of a modified construction of the control valve.
Figure 20:
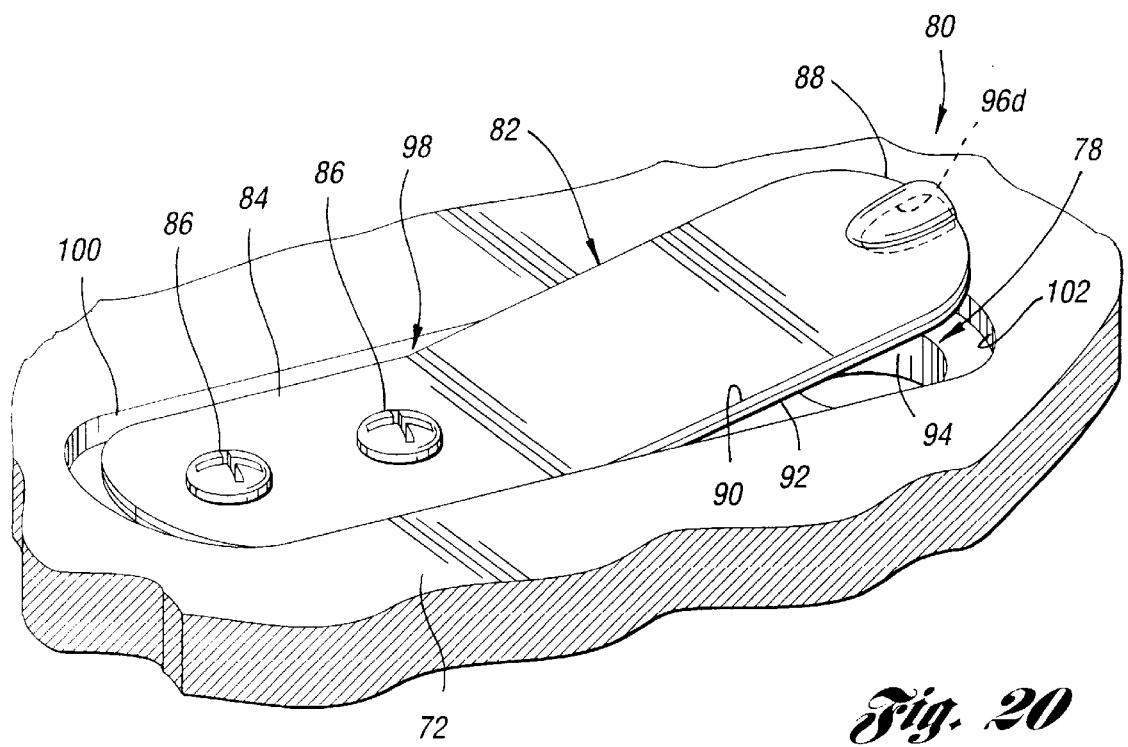
FIG. 20 is a perspective view similar to FIG. 8 but with the modified construction of the control valve.
Figure 21:
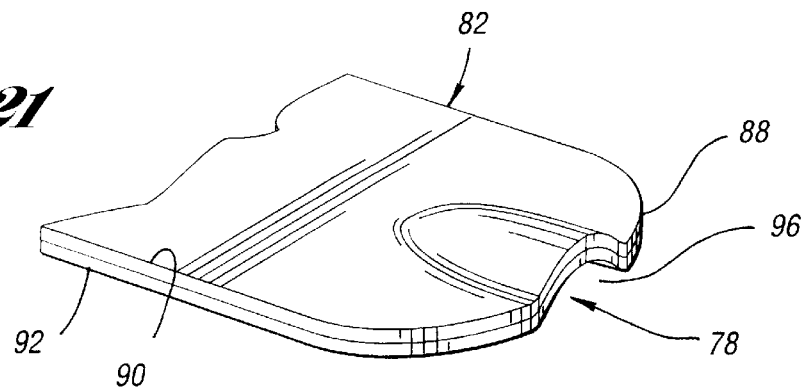
FIG. 21 is a partial view illustrating the distal end of the valve element which defines a bleed passage of the outlet port.

With reference to FIGS. 19–21, another version of the control valve 80d is illustrated and has the same construction as the previously described control valves except as will be noted such that like reference numerals are applied to like components thereof and the prior description is thus also applicable and will not be repeated. However, in this construction of the control valve 80d, the distal end 88 of the elongated bimetallic strip valve element 82 defines the bleed passage 96d of the outlet port 78 while the valve body provided by the piston 72 defines the main passage 94 of the port 78. Thus, in the closed position illustrated by phantom line representation in FIG. 19, the bleed passage 96d allows pressurized hydraulic fluid to bleed through the port 78 as with the previously described embodiment and, upon opening of the valve element 82 as illustrated by solid line representation, the bleed passage 96d is cleaned of any accumulation by the fluid flow in the same manner as previously described. The operation of both valve constructions is thus similar.

Each of the embodiments of the control valve described above has its control valve element 82 provided with the distal end 88 thereof extending in an inclined relationship with respect to its mounting portion or end 84 in the opened position of the valve. This inclined relationship is provided by a bend in the control valve element adjacent its mounting end 84. Upon movement to the closed position, the control valve element 82 assumes a generally flat shape.

With reference to FIGS. 22–28, further embodiments of the control valve 80e, 80e' 80f and 80f' are illustrated and have much of the same construction as the previously described control valves except as will be noted. As such, like reference numerals are applied to like components thereof and most of the prior description is thus also applicable and will not be repeated.

As illustrated in FIGS. 22 and 23, another embodiment of the control valve 80e includes a valve body 190 that is preferably injection molded from a suitable plastic and has one portion or end 100 at which the one portion or end 84 of the elongated valve element 82 is mounted by the fastener bolts 86 and has an end 102 at which the main passage 94 of the port 78 extends through the valve body. The valve element 82 is generally flat between its one portion 84 and its distal end 88. Recess 98 of the valve body 190 has a greater depth at the end 102 thereof than at the one portion provided by its end 100 and is inclined therebetween. As such, the control valve 80e is open with the flat valve element 82 mounted within the recess 98 and is closed by movement of the distal end 88 of the valve element toward the port 78 in the same manner previously described in connection with the bleed flow through the bleed passage 96.

With continuing reference to FIG. 22, a connector 192 of the control valve 80e is provided for securing the valve body 190 for use such as to the piston 72 as illustrated with a port portion 78' aligned with the port 78 of the valve body. This connector 192 as illustrated is embodied by a suitable plastic film 194 with a suitable adhesive on each side thereof so as to secure the valve body 190 within a recessed hole 196 of the piston 72. The film 194 may be die stamped to the required shape which as shown in FIG. 23 includes a port opening 78''.

Best results with the control valve 80e are achieved when the recess 98 has a curved surface 198 providing the inclination between its one portion 100 and its end 102. Thus, the elongated control valve element 82 moves into and out of engagement with the curved surface 198 by a continuously moving line as it is moved between the open and closed positions with respect to the port 78.

With reference to FIG. 24, another embodiment of the control valve 80e' has the same construction as the embodiment of FIGS. 22 and 23 except for the fact that its connector 192 instead of being a piece of double sided adhesive film is provided by at least one mechanical fastener 200,202. As illustrated, there is one fastener 200 through which the port 98 extends and which has a headed end 204 for providing a snap connection to the piston 72 through the piston port 78'. Furthermore, the other fastener 202 illustrated is located adjacent the recess mounting portion 100 extending through a hole 205 and has a snap connector end 206 for providing securement of the valve body 190 in position.

It should be appreciated that each of the embodiments illustrated in FIGS. 19–24 while illustrated for use on the piston 72 can also be mounted on the casing wall 70 for use in the supercharged circuit as illustrated in FIG. 18. Furthermore, each of the previously described elongated valve elements 82 has its elongated configuration provided by a straight shape although this elongated configuration can also be provided by a curved shape such as with the valve 76 shown in FIG. 18 and as is hereinafter more fully described in connection with the embodiments of FIGS. 25–28.

Figure 25:
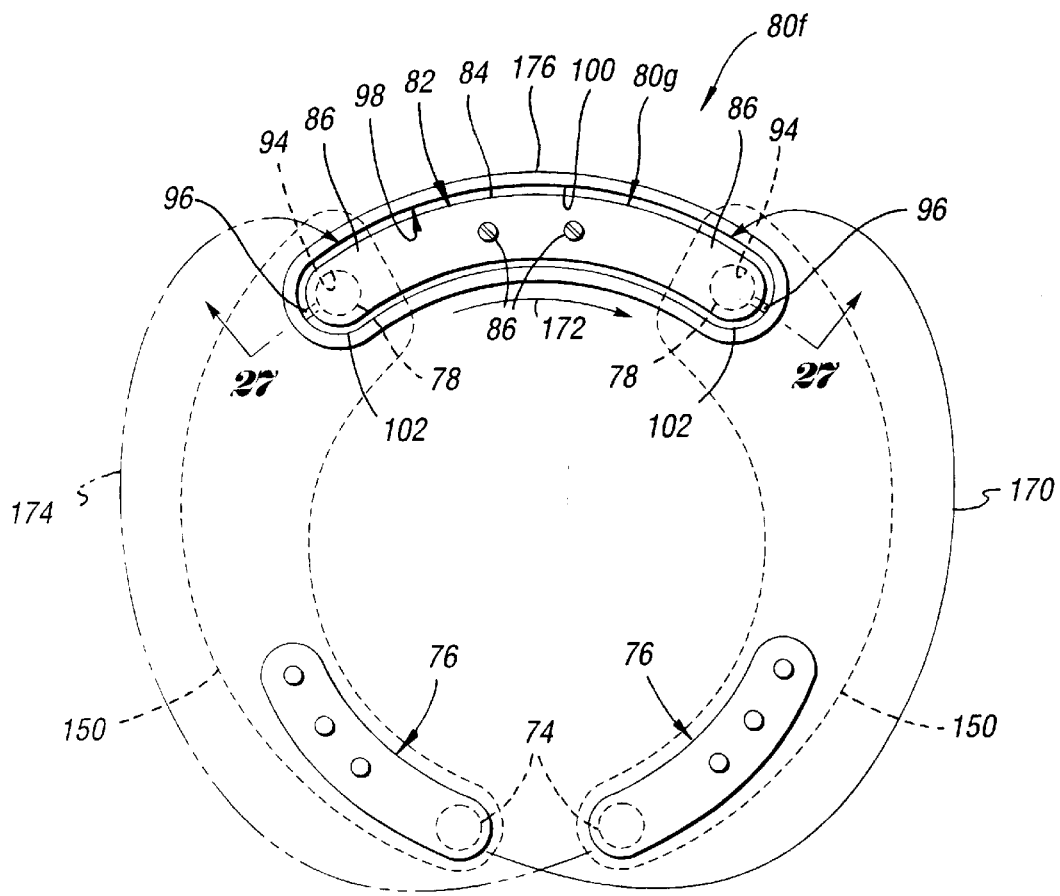
FIG. 25 is a view similar to FIG. 18 illustrating a further version of the supercharged circuit wherein the control valve of this invention is constructed to control a pair of ports.
Figure 26:
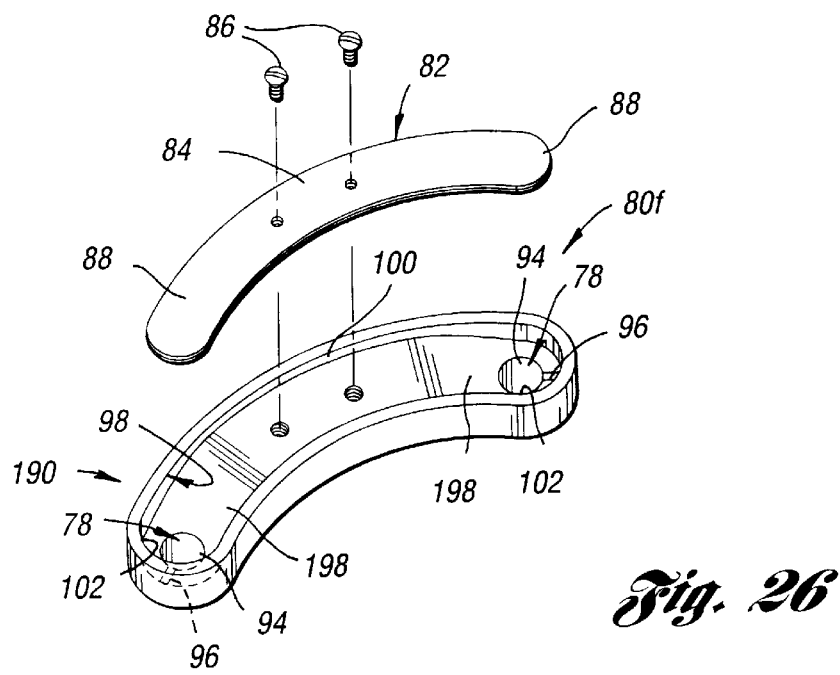
FIG. 26 is an exploded perspective view of the control valve of FIG. 25.
Figure 27:
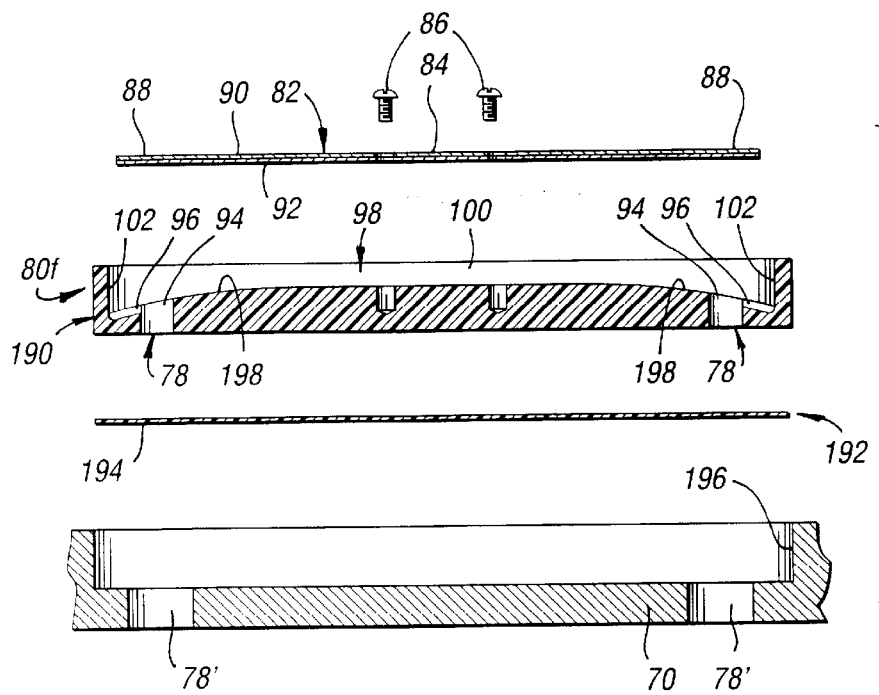
FIG. 27 is a sectional view taken along the curved line 27—27 of FIG. 25 in an exploded manner to further illustrate the construction of the control valve whose valve body is illustrated as being secured by an adhesive on a film.

With reference to FIG. 25, another embodiment of the control valve 80f is constructed to function in the supercharged circuit as previously described in connection with FIG. 19 but provides control of both ports 78 through the casing wall for flow back to the low pressure side of the hydraulic pump. More specifically as also shown in FIGS. 26 and 27, the valve body 190 of this embodiment of the control valve 80f has an elongated mounting recess 98 of a curved shape including opposite ends 102 and a curved intermediate portion 100 extending between its ends. The valve element 82 is generally flat like the embodiments of FIGS. 22–24 and has a pair of opposite distal ends 88 as well as a curved intermediate portion 84 extending between its ends. This curved intermediate portion 84 of the control valve element 82 is mounted within the recess 98 at the curved intermediate portion 100 thereof by the threaded fastener bolts 86. Both ports 78 have the same construction as each other with a main passage 94 and a bleed passage 96 that function as previously described adjacent the associated ends 102 of the recess 98. This recess 98 has a greater depth at each end 102 thereof than at the intermediate portion 100 and is inclined from each end thereof to its intermediate portion as illustrated in FIG. 27. This inclination is preferably provided by a pair of curved surfaces 198 such that each distal end 88 of the flat valve element 82 moves by a continually moving line into and out of engagement with the associated curved surface upon movement between the open and closed positions with respect to the associated port 78.

As illustrated in FIG. 27, the control valve 80f has a connector 192 that is embodied by a double-sided adhesive plastic film 194 like the previously described embodiment of FIGS. 22 and 23. Likewise, while the valve body 198 is preferably a plastic injection molding made from a suitable plastic or a die casting made from steel or aluminum, other ways of manufacturing the valve body are possible.

Figure 28:
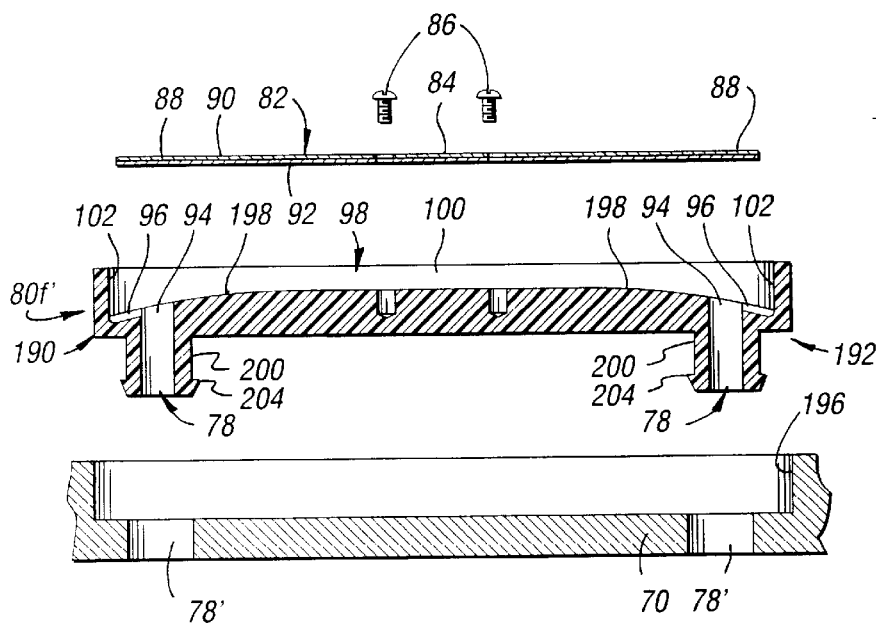
FIG. 28 is a sectional view of a further embodiment of the control valve taken in the same direction as FIG. 27 and having the same construction except for mounting thereof that is provided by mechanical fasteners illustrated as being injection molded with the valve body.

As illustrated in FIG. 28, another embodiment of the control valve 80f' has the same construction as the control valve 80g of FIGS. 25–27 but has its connector 192 embodied by a pair of the mechanical fasteners 200 like the control valve element of FIG. 24. As such, these mechanical fasteners 200 extend through suitable port portions 78' in the coupling wall 70 such that the control valve provides a control of the flow back to the pump in the manner previously described in connection with FIG. 19.

It should be appreciated that each of the embodiments of FIGS. 22–28 while illustrated with the valve body 190 as an injection molding could also be constructed as part of the piston or the coupling wall that provides part of the piston housing in the broadest aspect of the invention. However, particular advantages are achieved by the injection molding of the valve body as specifically disclosed.

It should also b e appreciated that each of the embodiments wherein the bleed passage 96 is illustrated as being part of a valve body could also have the bleed passage constructed as part of the distal end 88 of the associated valve element 82 like the embodiment of FIGS. 19–21.

The supplemental pressurized hydraulic fluid supply 103 of each embodiment of the hydraulic coupling can operate in different modes. First, the control 111 can be set so that the pump source 109 does not supply any pressurized hydraulic fluid to the hydraulic coupling such that coupling of the pair of rotary members 26 and 28 only takes place upon clutch actuation in response to differential rotation between the members and the control valve closing. Second and at the other extreme, the control 111 can be set so that the pump source 109 provides sufficiently pressurized hydraulic fluid to the hydraulic coupling to continuously actuate the clutch and thus continuously couple the pair of rotary members 26 and 28 when needed for the particular vehicle operation where that is desired. Furthermore, the control ill can operate the pump source 109 to provide intermediately pressurized hydraulic fluid to the coupling such that valve closing and clutch actuation takes place at a lower rate of differential rotation between the pair of rotary members 26 and 28 than is the case without any supplemental actuation. The extent to which the pump source 109 pressurizes the hydraulic fluid can be varied in order to control the amount of differential rotation between the pair of rotary members 26 and 28 at which the control valve closes to actuate the clutch and provide the coupling between these members.

The control 111 for operating the supplemental pressurized hydraulic fluid supply for the coupling can operate in many different ways. In its most basic operation, a vehicle driver mounted control such as a switch or valve can provide manual control that is most preferably variable to control the extent to which the fluid is pressurized to provide the supplemental clutch actuation. It is also possible for the vehicle computer to operate the control 111 in response to other vehicle or environmental variables such as engine speed, vehicle speed, vehicle inclination, vehicle acceleration, ambient temperature, wheel and axle speed differences, automatic brake system operation, and vehicle traction control system operation, etc. Such control can be through a dedicated electronic circuit that functions independently or in synchronization with other vehicle electronic systems.

Although the FIG. 1a embodiment of the hydraulic coupling having the differential gear set has been illustrated for use at the rear axle functioning as the primary drive axle, it is also possible to utilize this embodiment with the differential gear set at the front axle as part of a transaxle type vehicle drive system. Likewise, the embodiment of the hydraulic coupling illustrated in FIG. 1b can also be utilized as the auxiliary drive at the rear axle as well as at the front axle as previously described. Similarly, the embodiment of FIG. 1c can be utilized as part of a vehicle transfer case or other vehicle drivetrain component which is also the case with the other embodiments. Furthermore, the different constructions of the coupling as shown in FIGS. 1a, 1b and 1c can have the outlet port 78 and associated control valve 80 provided on the piston 72 or the casing wall 70'.

While the best modes for carrying out the invention have been described in detail, those familiar with the art to which this invention relates will recognize various alternatives, designs and embodiments for practicing the present invention as defined by the following claims.

What is claimed is:

1. A hydraulic coupling for use with a vehicle drivetrain within a housing thereof containing hydraulic fluid to rotatively couple a pair of rotary members about a rotational axis, the hydraulic coupling comprising: a casing of a hollow construction that is rotatable within the housing about the rotational axis; a hydraulic pump located within the casing along the rotational axis and including a toothed impeller rotatively connected to one of the rotary members and having external teeth; the hydraulic pump also including an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller as the pair of rotary members rotate relative to each other; an inlet port through which hydraulic fluid is pumped from the housing into the casing by the hydraulic pump; a clutch including a piston chamber located within the casing and having an actuating piston that is received within the piston chamber and actuatable by pressurized hydraulic fluid to engage the clutch and couple the two rotary members to each other; the casing including a transfer port through which the pressurized hydraulic fluid is pumped from the hydraulic pump to the piston chamber; the casing also including an outlet port through which pressurized hydraulic fluid flows from the piston chamber; a control valve including a valve element movable between an open position spaced from the outlet port and a closed position that generally closes the outlet port when the pumped fluid reaches a predetermined pressure to thereby further increase the pressure of the pressurized hydraulic fluid and actuate the piston and engage the clutch to thereby rotatively couple the pair of rotary members to each other; and a supplemental pressurized hydraulic fluid supply for feeding pressurized hydraulic fluid into the inlet port of the casing to the pump independent of pumping action of the pump.

2. A hydraulic coupling as in claim 1 wherein the supplemental pressurized hydraulic fluid supply includes a rotary seal assembly that is fixedly mounted within the housing and has seals that seal with the casing to define an inlet chamber that communicates with the inlet port; a first passage for feeding hydraulic fluid from the housing to the inlet chamber for flow through the inlet port upon pumping action of the hydraulic pump; the first passage having a check valve for preventing flow therethrough from the inlet chamber to the housing; a second passage for feeding pressurized hydraulic fluid to the inlet chamber; and a source of pressurized hydraulic fluid for selectively providing pressurized hydraulic fluid through the second passage to the inlet chamber.

3. A hydraulic coupling as in claim 2 wherein the second passage of the supplemental pressurized hydraulic fluid supply has a junction with the first passage thereof at a location toward the inlet chamber from the check valve of the first passage.

4. A hydraulic coupling as in claim 1 wherein the outlet port extends through the piston and the control valve is mounted on the piston.

5. A hydraulic coupling as in claim 1 wherein the casing includes a wall that separates the pump and the piston chamber, the transfer port extending through said wall from a high pressure side of the pump to the piston chamber, the outlet port extending through said wall from the piston chamber to a low pressure side of the pump.

6. A hydraulic coupling as in claim 1 wherein the coupling further comprises a differential gear set that extends between the casing and the pair of rotary members.

7. A hydraulic coupling as in claim 6 wherein the hydraulic pump and the clutch are located within the casing adjacent the one rotary member on one side of the differential gear set, and the other rotary member being located on the opposite side of the differential gear set from the hydraulic pump and the clutch.

8. A hydraulic coupling as in claim 1 further including a second hydraulic pump located within the casing along the rotational axis and including a second toothed impeller rotatively connected to the other rotary member and having external teeth; the second hydraulic pump also including a second internal ring gear mounted by the casing for rotation eccentrically with respect to the second toothed impeller and including internal teeth of a number one more than the external teeth of the second toothed impeller and in a meshing relationship therewith to provide a pumping action upon relative rotation between the casing and the second toothed impeller; a second inlet port through which hydraulic fluid is pumped into the casing by the second hydraulic pump; the clutch including a second piston chamber located within the casing and having a second actuating piston that is received within the second piston chamber and actuatable by pressurized hydraulic fluid to engage the clutch and couple the two rotary members to each other; the casing including a second transfer port through which the pressurized hydraulic fluid is pumped from the second hydraulic pump to the second piston chamber; the casing also including a second outlet port through which pressurized hydraulic fluid flows from the second piston chamber; a second control valve including a second valve element movable between an open position spaced from the second outlet port and a closed position that generally closes the second outlet port when the pumped fluid reaches a predetermined pressure to thereby further increase the pressure of the pressurized hydraulic fluid and actuate the second piston and engage the clutch to thereby rotatively couple the pair of rotary members to each other; and the supplemental pressurized hydraulic fluid supply being operable to feed pressurized hydraulic fluid into the second inlet port of the casing to the second pump independent of pumping action of the second pump.

9. A hydraulic coupling as in claim 8 wherein the clutch includes first and second clutch packs each of which includes a pair of sets of clutch plates that alternate with each other; one set of clutch plates of each clutch pack being rotatively fixed to the casing; the other set of clutch plates of the first clutch pack being rotatively fixed to the one rotary member; the other set of clutch plates of the second clutch pack being rotatively fixed to the other rotary member; and the clutch being located between the first mentioned piston and the second piston.

10. A hydraulic coupling as in claim 1 wherein the one rotary member has an elongated shape extending along the rotational axis, and the other rotary member having an annular shape and being mounted on the casing extending around the rotational axis.

11. A hydraulic coupling for use with a vehicle drivetrain within a housing thereof containing hydraulic fluid to rotatively couple a pair of rotary members about a rotational axis, the hydraulic coupling comprising: a casing of a hollow construction that is rotatable within the housing about the rotational axis; a hydraulic pump located within the casing along the rotational axis and including a toothed impeller rotatively connected to one of the rotary members and having external teeth; the hydraulic pump also including an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller as the pair of rotary members rotate relative to each other; an inlet port through which hydraulic fluid is pumped from the housing into the casing by the hydraulic pump; a clutch including a piston chamber located within the casing and having an actuating piston that is received within the piston chamber and actuatable by pressurized hydraulic fluid to engage the clutch and couple the two rotary members to each other; the casing including a transfer port through which the pressurized hydraulic fluid is pumped from the hydraulic pump to the piston chamber; the casing also including an outlet port through the piston to permit pressurized hydraulic fluid to flow from the piston chamber; a control valve including a valve element mounted on the piston for movement between an open position spaced from the outlet port and a closed position that generally closes the outlet port when the pumped fluid reaches a predetermined pressure to thereby further increase the pressure of the pressurized hydraulic fluid and actuate the piston and engage the clutch to thereby rotatively couple the pair of rotary members to each other; a supplemental pressurized hydraulic fluid supply including a rotary seal assembly that is fixedly mounted within the housing and has seals that seal with the casing to define an inlet chamber that communicates with the inlet port; a first passage for feeding hydraulic fluid from the housing to the inlet chamber for flow through the inlet port upon pumping action of the hydraulic pump; the first passage having a check valve for preventing flow therethrough from the inlet chamber to the housing; a second passage for feeding pressurized hydraulic fluid to the inlet chamber; and a source of pressurized hydraulic fluid for selectively providing pressurized hydraulic fluid through the second passage to the inlet chamber independent of pumping action of the pump.

12. A hydraulic coupling for use with a vehicle drivetrain within a housing thereof containing hydraulic fluid to rotatively couple a pair of rotary members about a rotational axis, the hydraulic coupling comprising: a casing of a hollow construction that is rotatable within the housing about the rotational axis; a hydraulic pump located within the casing along the rotational axis and including a toothed impeller rotatively connected to one of the rotary members and having external teeth; the hydraulic pump also including an internal ring gear mounted by the casing for rotation eccentrically with respect to the toothed impeller and including internal teeth of a number one more than the impeller teeth and in a meshing relationship therewith to provide a pumping action upon relative rotation between the casing and the toothed impeller as the pair of rotary members rotate relative to each other; an inlet port through which hydraulic fluid is pumped from the housing into the casing by the hydraulic pump; a clutch including a piston chamber located within the casing and having an actuating piston that is received within the piston chamber and actuatable by pressurized hydraulic fluid to engage the clutch and couple the two rotary members to each other; the casing including a wall having a transfer port through which the pressurized hydraulic fluid is pumped from a high pressure side of the hydraulic pump to the piston chamber; said casing wall also including an outlet port through which pressurized hydraulic fluid flows from the piston chamber to a low pressure side of the pump; a control valve including a valve element movable between an open position spaced from the outlet port and a closed position that generally closes the outlet port when the pumped fluid reaches a predetermined pressure to thereby further increase the pressure of the pressurized hydraulic fluid and actuate the piston and engage the clutch to thereby rotatively couple the pair of rotary members to each other; a supplemental pressurized hydraulic fluid supply including a rotary seal assembly that is fixedly mounted within the housing and has seals that seal with the casing to define an inlet chamber that communicates with the inlet port; a first passage for feeding hydraulic fluid from the housing to the inlet chamber for flow through the inlet port upon pumping action of the hydraulic pump, the first passage having a check valve for preventing flow therethrough from the inlet chamber to the housing; a second passage for feeding pressurized hydraulic fluid to the inlet chamber; and a source of pressurized hydraulic fluid for selectively providing pressurized hydraulic fluid through the second passage to the inlet chamber independent of the pumping action of the pump.

\* \* \* \* \*